(12) United States Patent
King

(10) Patent No.: US 10,929,664 B2
(45) Date of Patent: Feb. 23, 2021

(54) VISUAL OBSERVER OF UNMANNED AERIAL VEHICLE FOR MONITORING HORTICULTURAL GROW OPERATIONS

(71) Applicant: IUNU, INC., Seattle, WA (US)

(72) Inventor: Matthew Charles King, Seattle, WA (US)

(73) Assignee: iUNU, Inc., Seattle, WA (US)

(*) Notice: Subject to any disclaimer, the term of this patent is extended or adjusted under 35 U.S.C. 154(b) by 50 days.

(21) Appl. No.: 16/368,749

(22) Filed: Mar. 28, 2019

(65) Prior Publication Data

US 2019/0303668 A1  Oct. 3, 2019

Related U.S. Application Data

(60) Provisional application No. 62/650,851, filed on Mar. 30, 2018.

(51) Int. Cl.
  *G06K 9/00* (2006.01)
  *H04W 4/029* (2018.01)
  *B64C 39/02* (2006.01)

(52) U.S. Cl.
  CPC ........ *G06K 9/00657* (2013.01); *B64C 39/024* (2013.01); *G06K 9/00201* (2013.01); *H04W 4/029* (2018.02); *B64C 2201/126* (2013.01); *B64C 2201/127* (2013.01)

(58) Field of Classification Search
  CPC ........ B64C 2201/123; B64C 2201/127; B64C 39/024; G06K 9/00657; H04W 4/44
  See application file for complete search history.

(56) References Cited

U.S. PATENT DOCUMENTS

| | | | |
|---|---|---|---|
| 2014/0316616 A1* | 10/2014 | Kugelmass | G06T 11/206 701/8 |
| 2016/0050840 A1* | 2/2016 | Sauder | G06K 9/00657 701/3 |
| 2016/0224703 A1 | 8/2016 | Shriver | |
| 2016/0334276 A1 | 11/2016 | Pluvinage | |
| 2018/0028364 A1* | 2/2018 | Erickson | A61B 5/6887 |
| 2018/0075760 A1* | 3/2018 | Thompson | B64C 39/024 |
| 2018/0158197 A1* | 6/2018 | Dasgupta | G06K 9/726 |
| 2018/0343847 A1* | 12/2018 | Ervin | A01M 1/226 |
| 2019/0023396 A1* | 1/2019 | Hackert | B64C 39/024 |
| 2019/0066234 A1* | 2/2019 | Bedoya | A01D 41/1273 |
| 2019/0107440 A1* | 4/2019 | Pluvinage | G01J 3/0264 |

OTHER PUBLICATIONS

International Application No. PCT/US2019/024866, Search Report and Written Opinion dated Jun. 24, 2019, 12 pages.

* cited by examiner

*Primary Examiner* — David Bilodeau
(74) *Attorney, Agent, or Firm* — Han Santos, PLLC

(57) ABSTRACT

Disclosed is a technique for providing an Object Recognition Based Horticultural Feedback Analysis (ORB-HFA) feedback loop using an unmanned aircraft system (UAS). The techniques include determining a position of an unmanned aerial vehicle (UAV) of the UAS within a grow operation and providing a mission including one or more operations to the UAV based at least on the position of the UAV and feedback from one or more sensors residing at least partially on a visual observer device of the UAS to direct the UAV to perform the one or more operations in the grow operation, wherein the UAV is configured to capture one or more images of one or more plants included in the grow operation as the UAV performs the one or more operations of the first mission.

20 Claims, 15 Drawing Sheets

VISUAL OBSERVER OF UNMANNED AERIAL VEHICLE FOR MONITORING HORTICULTURAL GROW OPERATIONS

CROSS-REFERENCE TO RELATED PATENT APPLICATIONS

This application claims priority to U.S. Provisional Patent Application No. 62/650,851, filed Mar. 30, 2018, and entitled "Visual Observer of Unmanned Aerial Vehicle for Monitoring Horticultural Grow Operations," which is hereby incorporated by reference in its entirety.

BACKGROUND

Modern industrial horticultural operations include not merely the planting, cultivation, and harvesting of plants, but performing those operations with multiple plants, conditions, greenhouses, grow operations, and people, all in different geographic locations. Accordingly, collecting and marshaling of this information towards a coherent and effective horticultural operation is difficult. Generally, a master grower regularly collects information about a horticultural operation, identifies problems, identifies solutions for those problems and applies them for remediation. This monitoring and remediation cycle may be called a horticultural feedback loop.

Specifically, because the environments surrounding different respective grow operations vary widely, and much information is spread over different locations, a collection of information for a horticultural operation is difficult. Furthermore, information collected is generally of low fidelity, of dubious provenance, untimely, incomplete, and does not lend itself for determining a course of remedial action, let alone coordinate an operation-wide response. Even where information is collected in a centralized location, the information is not in a state to perform automated hi-fidelity, and therefore accurate, diagnosis and remediation.

An effective horticultural feedback loop is based on information collection and remediation based on the collected information. Accordingly, without hi-fidelity, reliable, timely, and complete information, and without central storage and automated diagnosis and remediation, the ability to implement an effective horticultural operational feedback loop, let alone an automated horticultural feedback loop, is therefore compromised.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
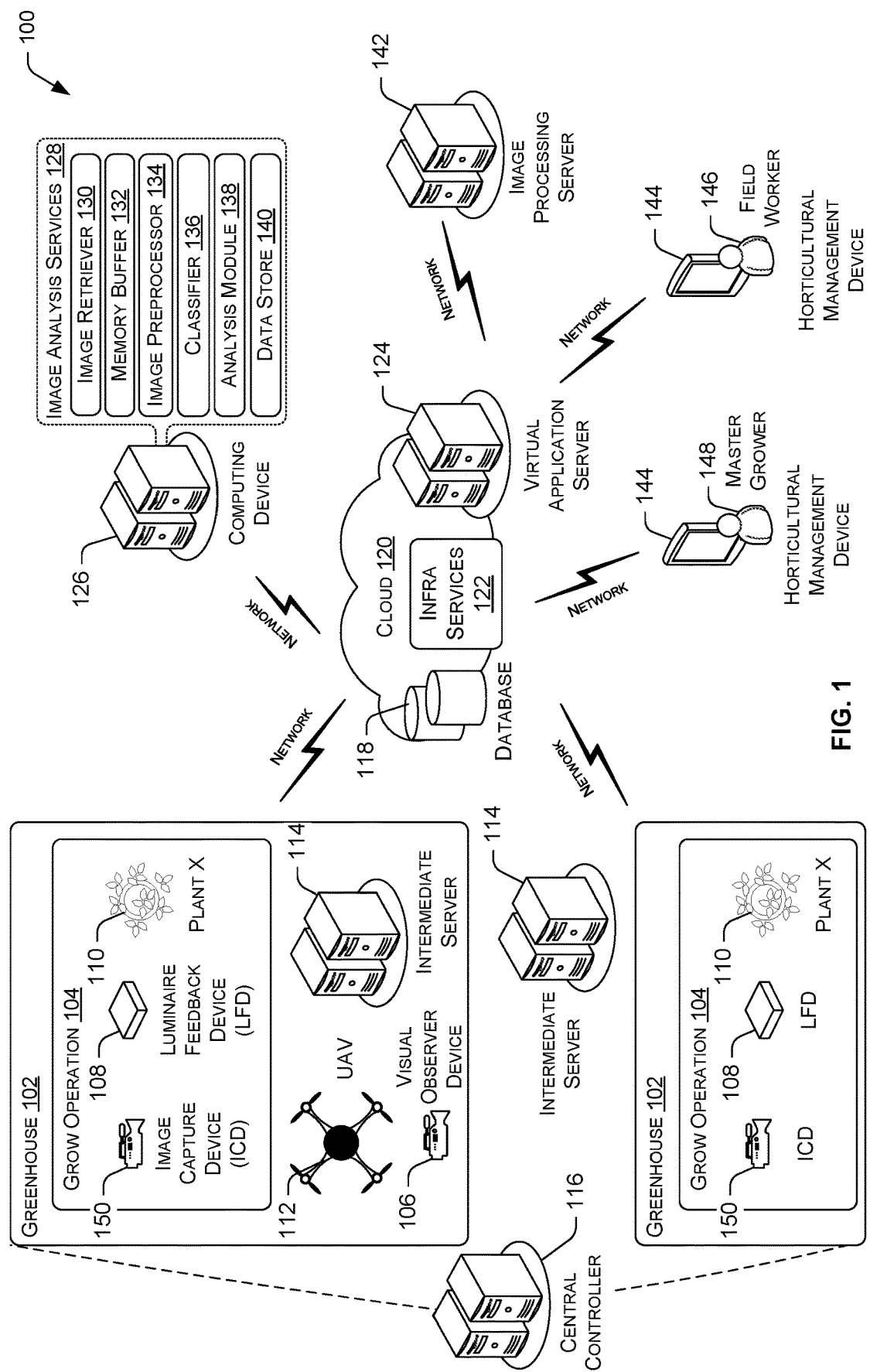
FIG. 1 is an architectural diagram for providing object recognition horticultural based feedback analysis.

A horticultural feedback loop is the regular and periodic monitoring of a horticultural operation to collect information about the operation, and to identify problems in the operation, solutions to those problems, and to perform remediation. A horticultural operation may include planting, cultivation, and harvesting of plants. Accordingly, information to be collected in a horticultural feedback loop will include manual spot checks on plants, which is a labor-intensive process. Additionally, there are a large number of variables including factors that may vary across location (e.g., people, climate, mechanical problems, etc.) that provide contextual information around plant measurements. Thus, environmental variables and other non-plant variables must be considered when collecting information.

An Object Recognition Based Horticultural Feedback Analysis (ORB-HFA) system is used to automate the spot checking process and to reduce variations in data resulting from multiple factors. In various embodiments, an image capture device such as digital video camera, a still image digital camera, and/or via UAV, may be used to take still images of plants periodically in order to regularly monitor the plants. The images may be collected, centralized, and then analyzed using computer object-recognition techniques and computer image analysis techniques to provide a critical mass of information for accurate automated diagnosis and recommendations for remediation.

The ORB-HFA system may facilitate providing remediation recommendations that may be dispatched to workers operating in various locations. Because the individual plants and their respective environments are being constantly monitored, the ORB-HFA system enables real-time or near real-time response and monitoring. For example, a remediation recommendation may be dispatched on one day, and a follow-up operation to determine the efficacy of the remediation recommendation may be performed later that same day.

The ORB-HFA system may also facilitate collecting data across an entire horticultural operation in a comprehensive manner. More specifically, because the data collection process is automated and can be implemented on a large-scale, the state of individual plants may be monitored at all times.

For example, a plant may be compared to the growth performance of past similar plants, or to the growth performance of other plants in the same horticultural operation. Thus, the ORB-HFA system can aggregate a critical mass of data to provide historical information that will allow a master grower to incorporate past experience in determining potential remediation courses of action. Some analysis may make use of machine learning/big data techniques. The results of this analysis may then be fed back into the ORB-HFA system to improve future diagnosis and remediation recommendations.

The ORB-HFA system also permits the application of computer object-recognition and computer image analysis techniques to provide a detailed analysis of each plant. For instance, each branch, leaf (or needle), root, and topology of a plant may be analyzed. Furthermore, the computer image analysis techniques can include color analysis to detect changes in color, such as the premature browning of leaves. Moreover, because each plant is being monitored, sequential analysis, or the comparison of images over time, may be applied to capture changes of the same plant over time. The techniques described herein may be implemented in a number of ways. Example implementations are provided below with reference to the following figures.

Example Architecture

FIG. 1 provides an exemplary context diagram 100 illustrating an ORB-HFA feedback loop that includes a UAS. A horticultural operation may cover one or more locations, such as a greenhouse 102. A greenhouse 102 may have one or more grow operations 104 each with one or more plants 110. The individual greenhouses 102 and/or grow operations 104 can comprise an operation zone. In various embodiments, each grow operation 104 can comprise one or more operation zones. Additionally, two or more operation zones can partially overlap. The plants 110 can comprise a single type of plant or multiple types of plants. In various embodiments, a single grow operation 104 may include multiple plants in different locations/greenhouses 102. Specifically, a grow operation 104 is a logical or a discrete group of plants 110 that are similarly situated such that the cultivation of each plant in the group is substantially similar.

One or more visual observer devices 106 are located at each grow operation 104. In various embodiments, the visual observer devices 106 include image capture devices that can be used to capture images of plants 110 or discrete group of plants and information related to each plant 110 or each group of plants for the horticultural feedback loop. In some embodiments, each individual plant may have a single dedicated image capture device 150. The image capture device 150 may be a digital video camera or may be a still image camera configured to capture images periodically and/or on demand. The image capture device may also comprise a UAV 112 configured to capture images periodically and/or on demand. Generally, an image capture device 150 may take visible light spectra pictures but may also extend to non-visible spectra such as infrared and ultraviolet. The image capture device 150 may have an onboard application programming interface (API) enabling programmatic control. Alternatively, the image capture device 150 may be networked thereby enabling remote control. The image capture device 150 may be controlled via an image caption function. The image capture function may be a part of the image capture device and/or a part of a luminaire feedback device 108. In another implementation, the image capture function may be part of a visual observer device and/or hosted on a computing device.

The visual observer device 106 may work in concert with a luminaire feedback device 108. The luminaire feedback device 108 provides light on a plant 110 and may be configured to change spectrum and intensity of the light on the plant 110 based on feedback from the visual observer devices 106 and/or other sensors. In some embodiments, the luminaire feedback device 108 may incorporate the image capture device. Furthermore, the luminaire feedback device 108 may operate in a network environment. Accordingly, the luminaire feedback device 108 may use internal logic to capture images with the image capture device and adjust the light spectrum and/or intensity based on an analysis. In some embodiments, the luminaire feedback device 108 may be configured to adjust light spectrum and/or intensity according to a remediation course of action, which can include one or more tasks to address an identified problem.

In various embodiments, the visual observer device 106, the UAV 112, the luminaire feedback device 108, and/or an image capture device may transmit images and other information to a central computing device 126 for providing image analysis services 128. Optionally, an intermediate server 114 may be used to store and/or queue the captured images and other information. The intermediate server 114 may in turn subsequently forward the captured images to the image analysis services 128. The intermediate servers 114 may also directly send the captured images to the image analysis services 128 if the image analysis services 128 and the intermediate servers 114 are on the same network. Additionally, or alternatively, the intermediate servers 114, may route the captured images to the image analysis services 128 via the Internet and/or the cloud 120. In other embodiments, the image analysis services 128 may be hosted in a virtual machine on the cloud 120. In some cases, the intermediate server 114 may be an on-premise or an off-premise server.

A service on the cloud 120 may also provide the services of an intermediate server 114 and/or provide the services of an image processing server 142. A server, either intermediate 114 or image processing server 142 may either be a physical dedicated server or may be a virtual machine. In the latter case, the cloud 120 may represent a plurality of disaggregated servers which provide virtual application server 124 functionality and virtual storage/database 118 functionality. The disaggregated servers may be physical computer servers, which may have a processor, a memory, an I/O interface and/or a network interface. The features and variations of the processor, the memory, the I/O interface and the network interface are substantially similar to those described for the host of the image capture function (e.g., a luminaire feedback device 108), the intermediate servers 114, and/or the image processing server 142. Differences may be where the disaggregated servers are optimized for throughput and/or for disaggregation.

Cloud services may be made accessible via an integrated cloud infrastructure. The cloud infrastructure not only provides access to cloud infra services 122 but also to billing services and other monetization services. The cloud infrastructure may provide additional service abstractions such as Platform as a Service (PaaS), Infrastructure as a Service (IaaS), and/or Software as a Service (SaaS), depending upon embodiments.

The image analysis services 128 may comprise an image retriever 130, a memory buffer 132, an image preprocessor 134, a classifier 136, an analysis module 138, and a data store 140. The image retriever 130 is configured to receive captured images from the visual observer device 106, the luminaire feedback device 108, the intermediate servers 114, and/or other data sources of the grow operation 104. The image retriever 130 may place one or more images in the memory buffer 132 where additional image processing services (e.g., image preprocessing, classification, analysis, etc.) may be applied.

The captured image in the memory buffer 132 may be persisted and aggregated in the data store 140. The data store 140 can comprise a data management layer that includes software utilities for facilitating the acquisition, processing, storing, reporting, and analysis of data from multiple data sources such as the visual observer device 106, the luminaire feedback device 108, an image capture device, intermediate servers 114, horticultural management devices 144, and/or so forth. In various embodiments, the data store 140 can interface with an API for providing data access.

The image analysis services 128 can provide image analysis as well as problem identification and potential courses of action for remediation. Upon identifying at least one course of action for remediation, the image analysis services 128 may interact directly with a horticultural management device 144, a UAV 112, or other components used in the grow operation 104 via the visual observer device 106, the luminaire feedback devices 108, intermediate servers 114, and/or other interfaces to the grow operation 104. For example, the image analysis services 128 may transmit commands to one or more UAVs 112 to fly over a particular path within the grow operation 104 to capture images or collect other sensor data.

In another example, the image analysis service 128 may transmit to the horticultural management device 144, information related to problem identification. In various embodiments, the image analysis service 128 can request additional information from the horticultural management device 144. If multiple horticultural management devices 144 are used, the image analysis service 128 can request additional information from a selected horticultural management device of a plurality of horticultural management devices based on one or more conditions, such as the real-time location of the horticultural management device 144 and/or the registered operator (e.g., a master grower 148 or other workers 146) of the horticultural management device 144. In this regard, one or more master growers 148 or workers can be associated with a horticultural management device 144.

Additionally, or alternatively, one or more course of actions for remediation may be provided to a horticultural management device 144 that is operated by a master grower 148 or other field workers 146 responsible for at least one grow operation 104 and/or a worker who is to perform the actual tasks comprising a course of action for remediation. In one embodiment, all or a portion of the course of action for remediation may be displayed in a horticultural management device 144 for view and interaction by the master grower 148 and/or other workers.

The horticultural management device 144 may be any networked computer, including mobile tablets over Wi-Fi and/or mobile tablets over a cellular network and/or laptops. The horticultural management device 144 may connect to the cloud 120, directly to the image analysis services 128, or directly to the grow operation 104, via intermediate servers 114, luminaire feedback devices 108, visual observer devices 106, and/or other interfaces to the grow operation 104. Accordingly, the ORB-HFA system enables the collection of complete and comprehensive information collection, potentially to the point of one dedicated image capture device per plant, the offloading of sophisticated image analysis services 128 to a central point (i.e., the computing device 126) for analysis and determining a course of action for remediation as needed, and the distribution of the course of action for remediation either directly with a grow operation, or to individuals 146, 148 responsible for the grow operation. In this way, the ORB-HFA system enables an improved horticultural feedback loop.

In various embodiments, multiple grow operations 104 may be managed via a central controller 116. Each grow operation 104 may include one or more visual observer devices 106 to monitor plants 110 in the grow operation 104. Thus, the central controller 116 can be operatively connected to or can communicate with one or more visual observer devices 106. The visual observer devices 106 can monitor and control the flight operations of one or more UAVs 112 in the grow operation 104. The central controller 116 may provide, without limitations, mission planning and/or safety oversight for several grow operations 104 concurrently using one or more UAVs 112, wherein the grow operations 104 may not be near each other. The central controller 116 may include one or more cameras to monitor the operation of the UAVs 112 within each respective grow operation 104, as well as the operation of the UAVs 112 while they are located outside of the grow operation (e.g., aisles, hallways, etc.) but within a greenhouse 102 or other target areas.

Figure 2:
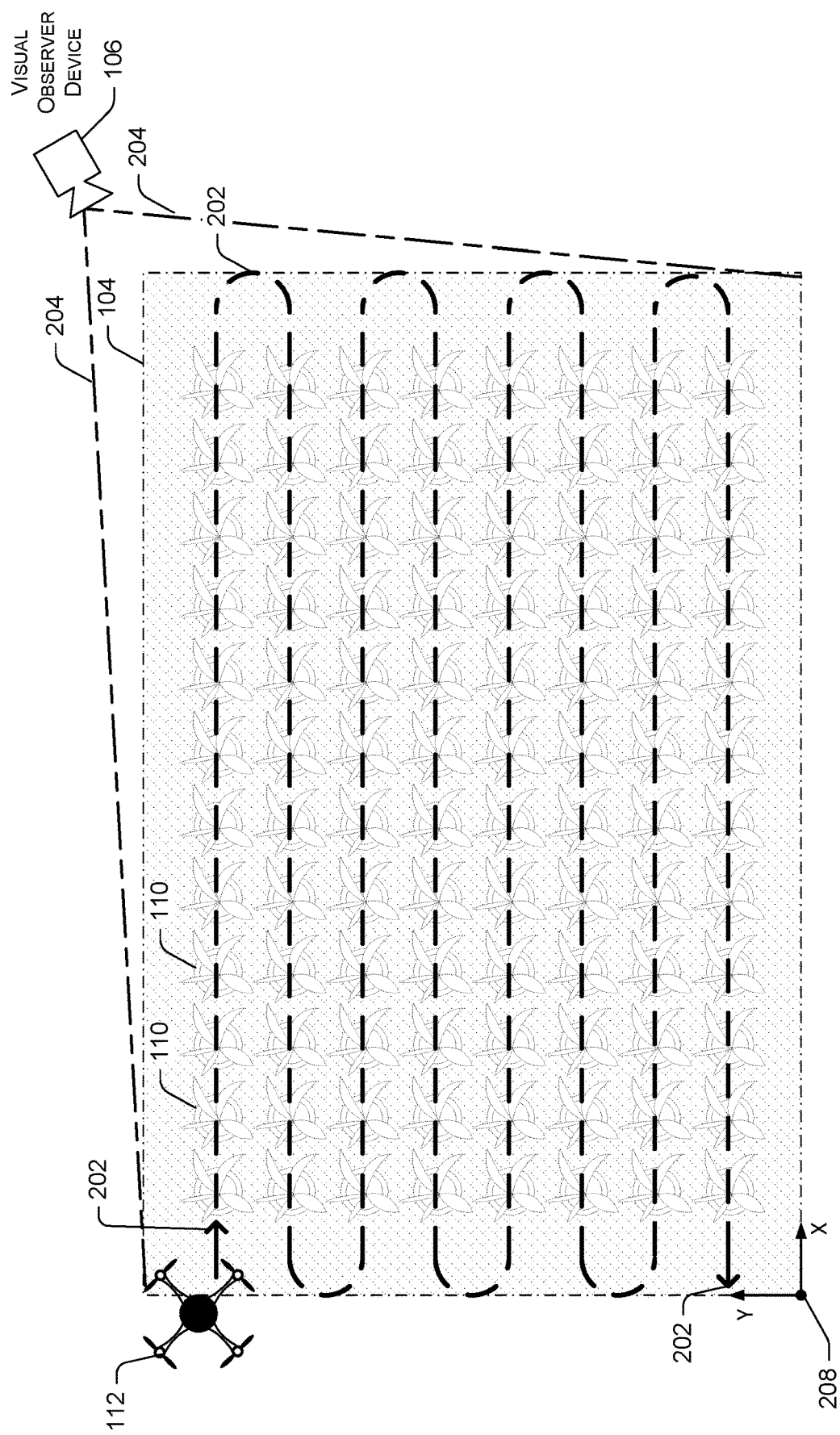
FIG. 2 illustrates an example of an unmanned aircraft system (UAS) for a grow operation.

FIG. 2 illustrates an overhead view of an example UAS for a grow operation 104. The UAS includes at least one UAV 112 and a visual observer device 106. The visual observer device 106 may include a camera and/or one or more sensors (e.g., Light Detection and Ranging (LIDAR)) to track the position of the UAV 112 and/or the surrounding environment for safely navigating the UAV 112 through the grow operation 104. Thus, in one example, a visual observer device 106 may be positioned near the grow operation 104 such that its cameras/sensors have a field of view 204 to ensure a complete and unobstructed view of the UAV 112 as the UAV 112 moves about the grow operation 104. In another example, a visual observer device 106 may include a camera that is controlled by mechanical gimbal to allow automatic tracking of the UAV 112 with a narrower field of view. In yet another example, multiple visual observer devices 106 may be positioned in various locations of grow operation 104 to provide multiple viewpoints of UAV 112.

The visual observer device 106 is configured to wirelessly communicate with the UAV 112 to continuously provide UAV 112 with flight commands or other operational commands to direct UAV 112 along a path 202. In one example, the path 202 is predetermined and stored in the visual observer device 106. The path 202 may be configured such that UAV 112 is able to capture one or more images of the desired plants 110 or group of plants or collect other sensor data in the grow operation 104. The illustrated path 202 is one possible example of a path that allows images of each and every plant 110 included in the grow operation to be acquired by the UAV 112. However, other paths, including paths that allow images of one or more plant 110 to be captured by UAV 112 or paths that allow collection of various plant or environmental data by UAV 112 may be incorporated.

In operation, the visual observer device 106 may be configured to capture one or more images of the UAV 112 to determine a position of the UAV 112 within the grow operation 104. In one example, the visual observer device 106 is physically located in a known position with respect to the grow operation 104. Thus, the visual observer device 106 may utilize one or more computer vision techniques and/or data from one or more sensors (e.g., LIDAR) to determine a position of the UAV 112 with respect to the visual observer device 106. Based on the relative position of the UAV 112 with regards to the visual observer device 106, the visual observer device 106 may then determine the position of the UAV 112 with respect to the grow operation 104. In one aspect, the position of the visual observer device 106 is predetermined with respect to a reference point 208. Thus, determining the position of the UAV 112 may also be determined with respect to reference point 208.

In response to determining the current position of the UAV 112, the visual observer device 106 may wirelessly transmit one or more navigational commands to the UAV 112 (e.g., thrust, roll, pitch, yaw, etc.) such that the UAV 112 is moved along the path 202. In one example, UAV 112 is configured to automatically capture a series of images of plants 110 as the UAV 112 moves along the path 202. In another example, the visual observer device 106 may send a command to the UAV 112 to trigger the UAV 112 to capture an image of a plant 110 at its current position.

The above example illustrates the visual observer device 106 providing continuous navigational commands to the UAV 112 to direct the UAV 112 along the path 202. In another example, the visual observer device 106 may send the complete path 202 to the UAV 112, such that the UAV 112 may determine its own position and guide itself along the path 202. In either case, the visual observer device 106 may continue monitoring the position of the UAV 112 and surrounding area to provide additional controls and/or to ensure safe operation (e.g., collision avoidance) of the UAV 112.

Additionally, the visual observer device 106 can provide continuous operational commands to the UAV 112 to direct the UAV 112 to perform one or more operations or abort a mission. For example, the UAV 112 may be instructed to deliver fertilizer, water, and/or tools to an operation zone in a grow operation. The UAV 112 may also be recalled to a charging station or a home station.

Figure 3:
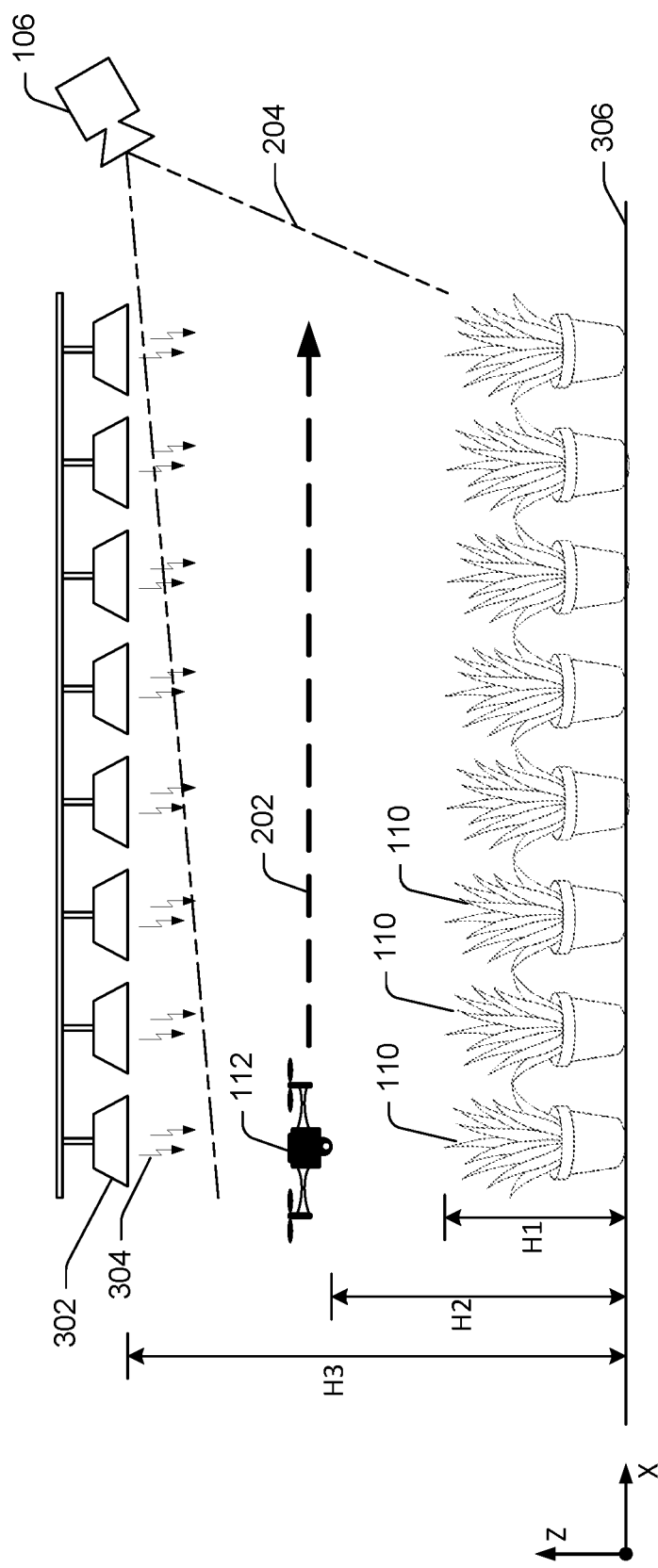
FIG. 3 illustrates another example UAS for a grow operation that includes one or more luminaire devices for providing light to plants.

FIG. 3 illustrates another example UAS for a grow operation that includes one or more luminaire devices 302 for providing light 304 to plants. In some examples, the grow operation is outdoors and thus, natural sunlight is utilized as the light source for plants 110. However, in other examples, the grow operation may be located indoors such that artificial light is needed to ensure proper growth of the plants 110. Luminaire devices 302 can comprise luminaire feedback device 108 of FIG. 1.

The UAV 112 may be directed to follow a path 202 that has an altitude (i.e., height H2 as measured from ground 306). Thus, the visual observer device 106 may be configured to generate navigation commands for controlling the movement of the UAV 112 along the path 202 such that a substantially constant height H2 is maintained. In another example, the height of the UAV 112 may be maintained relative to a height of the plant canopy (e.g., height H1). That is, as the plants 110 grow taller, the path 202 may be provided to the UAV 112 such that the UAV 112 maintains a substantially constant height above the top canopy of the plants 110. In yet another example, the luminaire devices 302 may be fixedly attached within the grow operation at a height H3. Thus, the height H2 of UAV 112 may be maintained such that height H2 is between heights H1 and H3. In one aspect, the height H3 of the luminaire device 302 is dynamically adjustable via a mechanically operated hoist. In one example, the hoist (not shown) is configured to receive commands from a master controller to adjust the height of the luminaire device 302 based on one or more readings/images from a sensor to maintain a predetermined distance between the luminaire device 302 and a plant 110.

Accordingly, in one example, the height H2 of the UAV 112 may be dynamically adjusted in response to changes in height H3 of the luminaire device 302 and/or in response to changes in the height H1 of the plant canopy.

Figure 4:
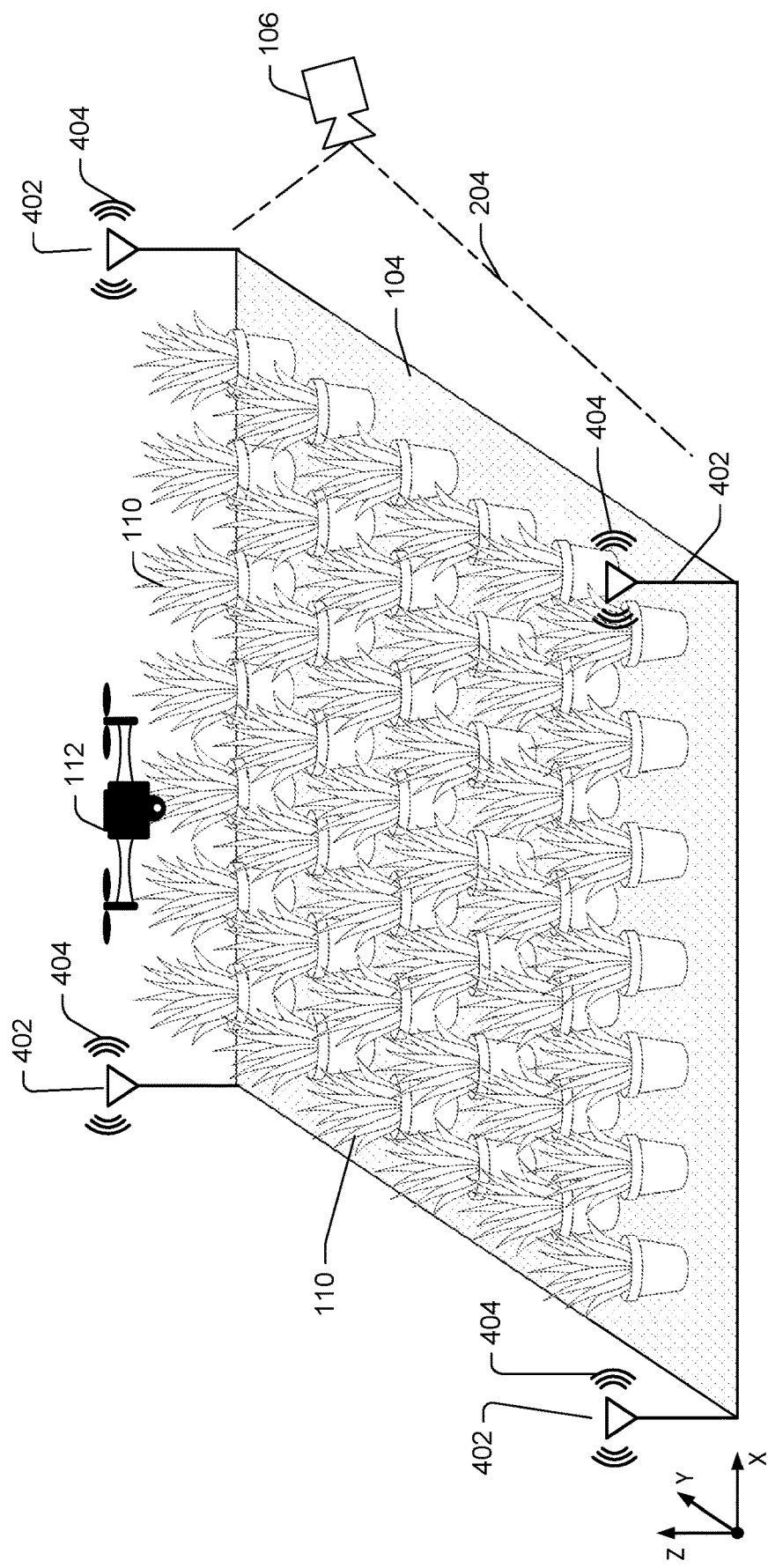
FIG. 4 illustrates another example UAS for a grow operation that includes one or more beacons for aiding in an unmanned aerial vehicle (UAV) position determination.

FIG. 4 illustrates another example UAS for a grow operation 104 that includes one or more beacons 402 for aiding in the UAV 112 position determination. The UAV 112 may include a positioning module to determine the current position of the UAV 112. In one example, the positioning module may include a LIDAR system that utilizes the Time of Flight method (ToF), where the LIDAR system is configured to measure a time delay between the time at which a laser pulse is sent into the environment, and the time at which the reflected signal pulse (i.e., an echo) is detected by the LIDAR system. In yet another example, the positioning module may perform position determination using known time of arrival (TOA) techniques such as, for example, radio-based trilateration based on one or more beacon signals 404 generated by the beacons 402. In one aspect, the beacons 402 are located within the grow operation at known (e.g., predefined) locations. In yet another example, the beacons 402 may include Wi-Fi access points, where the beacon signals 404 are Wi-Fi signals generated by the Wi-Fi access points.

In some implementations, the grow operations 104 and/or greenhouse may include one or more visual markers or geomarkers at various locations throughout the building to aid the UAV 112 in determining its location. By way of example, one or more visual matrix codes, such as QR codes, Aztec Codes, or Maxi Codes, may be placed at known locations (e.g., on the floor, on the wall, etc.), where the UAV 112 may detect the presence of the visual matrix codes (e.g., by way of images captured with cameras and/or the visual observer device 106 having a field of view 204 of the grow operations 104) and where the positioning module is configured to then determine the UAV position based on one or more computer vision techniques.

Figure 5:
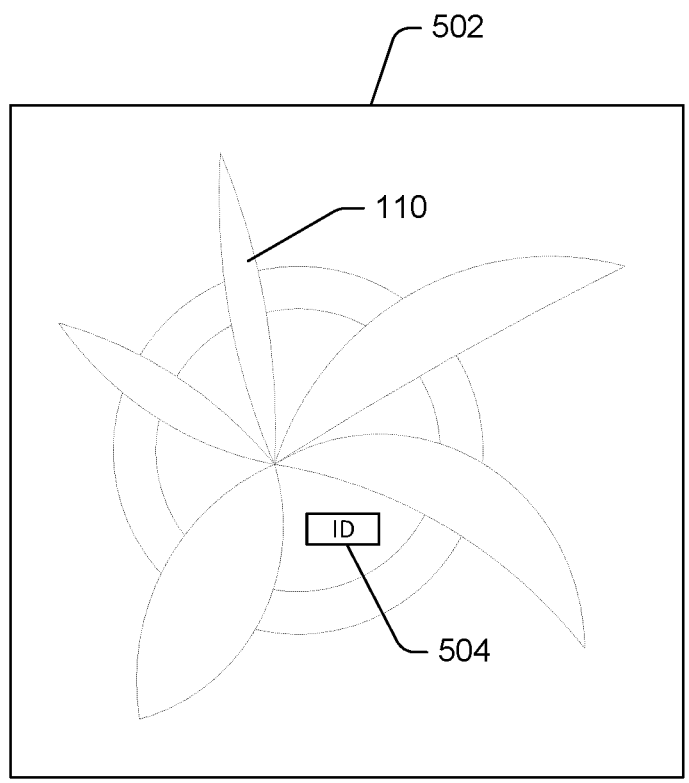
FIG. 5 illustrates an example image captured by a UAV for use in horticultural feedback analysis.

FIG. 5 illustrates an example image 502 captured by a UAV for use in horticultural feedback analysis. The UAV is configured to capture one or more images 502 of plants 110 or groups of plants as the UAV traverses the path. In one example, each image 502 includes a single plant 110. In other examples, each image 502 may include more than one plant 110. In some aspects, the UAV is configured to wirelessly transmit the image 502 to an intermediate server or directly to image analysis service continuously as the UAV traverses the path. In another example, the UAV is configured to store all acquired images 502 until the UAV has traversed the entire path, where the images 502 are uploaded once the UAV has landed.

The processing of the images 502 by image analysis services may include classifying the plant 110 as a certain plant type, and/or identifying the plant 110 as the same plant that was previously identified. In some implementations, each plant 110 included in the grow operation may be affixed with an identifier 504. The identifier 504 may be a barcode, QR code, or another visually-readable identifier that provides the type of plant and/or a unique identifier of this particular plant. In some examples, the barcode and/or QR code may be analyzed after the image 502 has been uploaded to the image processing server. In other examples, the UAV may include a reader (e.g., barcode reader and/or QR code reader) to read the identifier 504 as the UAV passes over each plant 110. Thus, in this example, the UAV may be configured to append the plant identification into meta-data associated with each image 502. In yet other examples, the identifier 504 may include a radio-frequency identification (RFID) and/or near-field communication (NFC) tag. Thus, UAV may include an RFID reader and/or NFC reader to detect the identifier 504 and append corresponding plant 110 identification data into the captured image 502.

Example Computing Device Components

Figure 6:
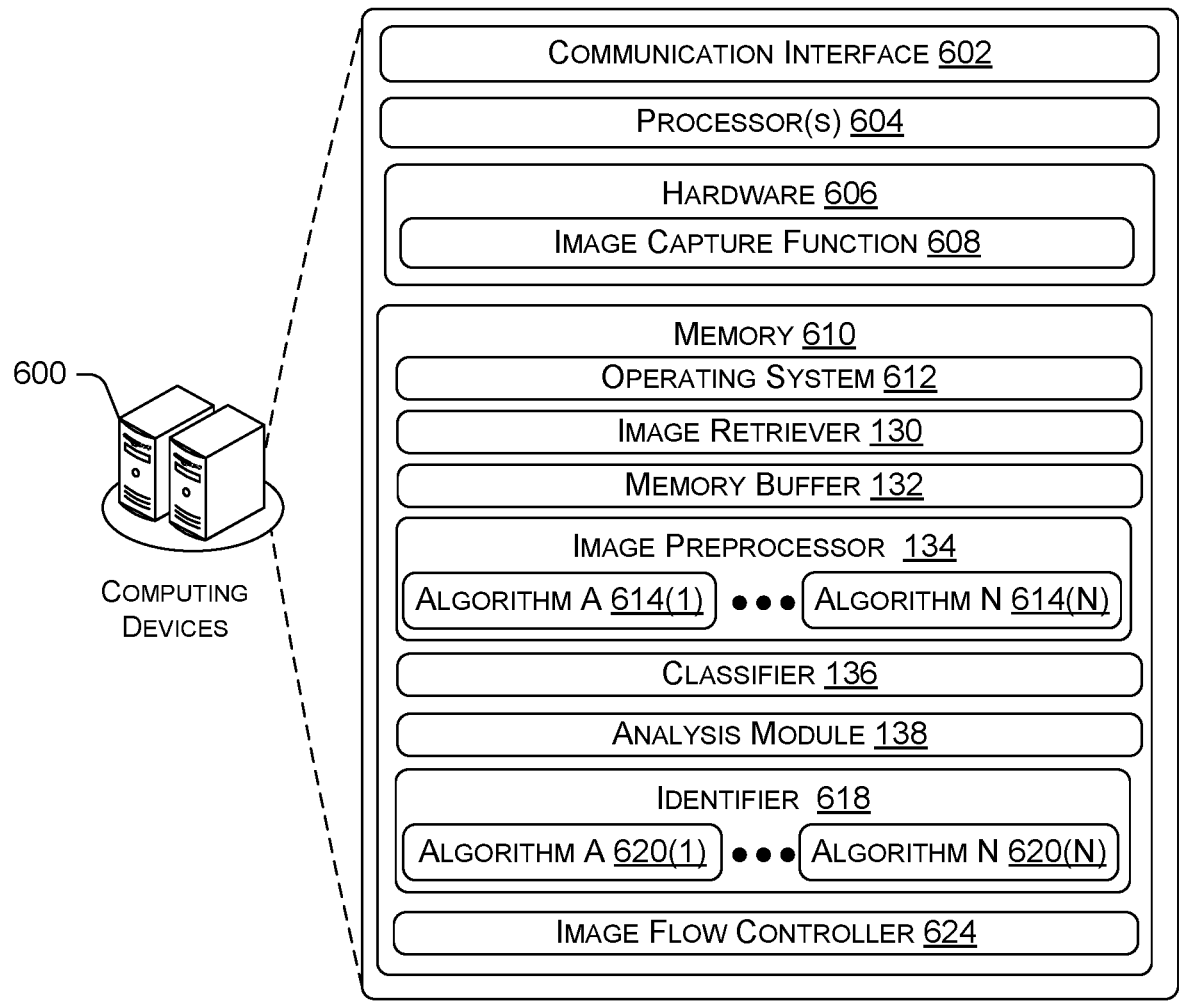
FIG. 6 is a block diagram of an exemplary hardware, software and communications environment for object recognition based horticultural feedback analysis.

FIG. 6 is a block diagram showing various components of illustrative computing devices 600 for providing the ORB-HFA and related techniques such as image analysis services. The computing devices 600 can comprise an image processing server, an intermediate server, a central computing device, and/or so forth. It is noted that the computing devices 600 as described herein can operate with more or fewer of the components shown herein. Additionally, the computing devices 600 as shown herein or portions thereof can serve as a representation of one or more of the computing devices of the present system.

The computing devices 600 may include a communication interface 602, one or more processors 604, hardware 606, and memory 610. The communication interface 602 may include wireless and/or wired communication components that enable the computing devices 600 to transmit data to and receive data from other networked devices. In at least one example, the one or more processor(s) 604 may be a central processing unit(s) (CPU), graphics processing unit(s) (GPU), both a CPU and GPU or any other sort of processing unit(s). Each of the one or more processor(s) 604 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 604 may also be responsible for executing all computer applications stored in the memory, which can be associated with common types of volatile (RAM) and/or non-volatile (ROM) memory. The hardware 606 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices. Additionally, the data input devices may include an image capture function 608. In some embodiments, the image capture function 608 can be a part of a luminaire feedback device.

The memory 610 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 610 may also include a firewall. In some embodiments, the firewall may be implemented as hardware 606 in the computing devices 600.

The processors 604 and the memory 610 of the computing devices 600 may implement an operating system 612. The operating system 612 may include components that enable the computing devices 600 to receive and transmit data via various interfaces (e.g., user controls, a communication interface, and/or memory input/output devices), as well as process data using the processors 604 to generate output. The operating system 612 may include a presentation component that presents the output (e.g., display the data on an electronic display, store the data in memory, transmit the data to another electronic device, etc.). Additionally, the operating system 612 may include other components that perform various additional functions generally associated with an operating system.

The processors 604 and the memory 610 of the computing devices 600 may also implement an image retriever 130, a memory buffer 132, an image preprocessor 134, which may further include one or more image preprocessing algorithms 614(1)-614(N), a classifier 136, an analysis module 138, an identifier 618 which may further include one or more identifier algorithms 620(1)-620(N), and an image flow controller 624.

The image retriever 130 manages the receiving of images from image capture functions 608. The throughput of images and supplementary data may differ. Accordingly, the image retriever 130, may manage the timing, speed, and the party controlling the data transfer. For example, it may act as a simple store, which receives and stores images upon receipt as pushed by an image capture function 608. Alternatively, it may affirmatively pull images for image capture functions.

One example of a pull scenario is where the one or more computing devices 600 are first joining the network. The image capture function 608 may be implemented in another computing device or a luminaire feedback device. When this happens, one or more image capture functions 608 could potentially overload the computing devices 600 by sending a large number of images. To prevent overload, the image retriever 130 may negotiate a controlled transfer with the one or more image capture functions 608.

When the image retriever 130 receives an image, it may store the received image in the image buffer 132. The image buffer 132 is dedicated memory, generally part of the memory 610, where a retrieved image may reside to be processed. Common image buffers 132 are contiguous dedicated RAM, where the data comprising an image may be accessed directly rather than via a series of central processing unit commands. Generally, such a configuration is via a GPU.

Once an image is in the buffer 132, the image may be subjected to one or more image processing and analysis operations. The image preprocessor 134 performs any transformations to an image enable analysis to increase the likelihood of successful analysis. Example operations to enable analysis are to decompress and/or decrypt incoming images via the respective decompression and/or decryption algorithms 614(1)-614(N). Example operations to increase the likelihood of successful analysis in order to apply one or more transformations and/or content analysis algorithms 614(1)-614(N) are Gaussian blur and Red-Green-Blue (RGB) content analysis.

Generally, an analysis is performed later in the image workflow of the computing devices 600. Where possible, algorithms 614(1)-614(N) attempt to take partial images, corrupt images, or otherwise substandard images and apply corrections sufficient to support analysis. However, the image preprocessor 134 may also contain logic to remove images with insufficient information or low quality images from the workflow. In this way, data collected during subsequent analysis will not contain data from corrupt or misleading images. This cleaning logic may be part of the image preprocessor 134 or alternatively may be in a separate image cleaning software component.

Once preprocessing is complete, the classifier 136 is configured to identify which portions of an image represent the plant to be analyzed as opposed to portions of the image representing items other than the plant to be analyzed. The classifier 136 identifies discrete objects within the received image and classifies those objects by size and image values, either separately or in combination. Example image values include inertia ratio, contour area, and Red-Green-Blue components. Based on those values, the objects are ranked and sorted. Items above a predetermined threshold or the highest N objects are selected as portions of the received image representing the plant.

After classification, the identifier 618 is configured to identify the plant in the received image and to identify artifacts in the plant. The identifier 618 may compare the image data of the plant in the received image to that of other images that may be stored in a database (e.g., an image database). In order to perform those comparisons, the identifier 618 may create a plant state vector comprised of values and value sets generated by one or more algorithms 620(1)-620(N) of the identifier 618. Such as constructed vector corresponds to the state of a plant in an image and is compared against other plant state vectors to perform general comparisons as well as sequential analysis. In various embodiments, series of state vectors may be used.

The identifier 618 contains several identification algorithms 620(1)-620(N). Some algorithms 620(1)-620(N) work directly on a single image. Other algorithms 620(1)-620(N) may process a series of images classified together into a category, collect information in common, and apply to subsequent images. Example categories may be images of the same plant over time, images of the same genus and species of plant, and images of plants given the same care.

One example of the latter case is where the identifier 618 collects color histogram data over a plurality of images of the same category and generate an average histogram comprised of the averages or weighted averages of each distribution variable comprising the histogram. Accordingly, when an image is received belonging to the same category, the identifier 618 may use the average histogram to identify the plant and artifacts in the plant. The average histogram is then recalculated using the histogram of the incoming image. In this way, the average histogram becomes an adaptive histogram with improving performance. In some embodiments, the logic to perform analysis using data from a plurality of images, or performing computationally intense logic, may be separated from the identifier 618 into another software component such as an edge cleaner software component.

The analysis module 138 takes the transformed image, and potentially any generated additional information, such as a plant state vector, and maps portions of the image to indicia corresponding to a feature of a plant. This indicia is called an artifact. Because the classifier 136 identified objects comprising portions of a plant, those portions may be subjected to analysis of visual information. Because the identifier 618 may have generated branch information about plant branches, leaf structure, and root structure, branch analysis may identify not only artifacts but artifacts indicating issues in the plant.

If at least one artifact corresponds to an issue with a plant, the analysis module 138 may also retrieve corresponding recommended courses of action to remediate the issue. Such information may be subsequently sent to the grow operation, intermediate server, luminaire feedback device, image capture device, and/or other entry points into the grow operation.

The computing devices 600 may have access to a data store. The computing devices 600 may store raw images, transformed images, generated plant state vectors, and other related information for archival and/or reporting after processing is complete. The data store may be configured as a relational database, an object-oriented database, a NoSQL database, and/or a columnar database, or any configuration to support scalable persistence.

Reporting may be performed by a querying software component (not shown). Because each image is associated with a plant, date/time stamp, plant state vector, and potentially identified issues, images may be queried by any or all of these data values.

As described above, the ORB-HFA provides infrastructure capable of collecting image and other information on a per plant basis, applying sophisticated image analysis, applying sophisticated horticultural analysis to diagnose problems and recommend a remedial course of action, all while distributing the relevant information to workers and or devices in the grow operation.

The image flow controller 624 is configured to manage the capture of images, receive images from an image capture device (if not integrated with the image capture function 608), the local management of received images, and transmit the received images from the image capture function 608 over a network. The image flow controller 624 may store a configuration setting of how many images an image capture device is to capture, the resolution the image is to be captured, the format the image is to be stored, and any other processing to be performed on the image. The image flow controller 624 may store a captured and/or received image in the memory buffer 132 and designate the file name of the received image. The image flow controller 624 may operate with other applications that may perform image processing, such as compression and/or encryption.

The image flow controller 624 may also manage the transmission of received images. Specifically, it may transmit an image to a known network location via the network interface 602. The known network locations may include an intermediate server, the Internet, the cloud, and/or an image processing server.

Upon transmission, the image flow controller 624 may enlist in notifications to determine that the transmission was successful. The image flow controller 624 may also transmit notifications to other device subscribing to its notifications indicating the status of the transmission.

Example Unmanned Aerial Vehicle Components

Aspects of the present disclosure also include the use of a UAV to provide horticultural feedback data (e.g., plant images) for analysis in monitoring one or more grow operations. The UAV may be a single aerial drone tasked for this mission, or it may be from a group of like-tasked UAVs that are monitoring conditions at a greenhouse/grow operation. The UAV may be operated in accordance with applicable laws and regulations, such as requirements provided by the Federal Aviation Administration (FAA).

Figure 7:
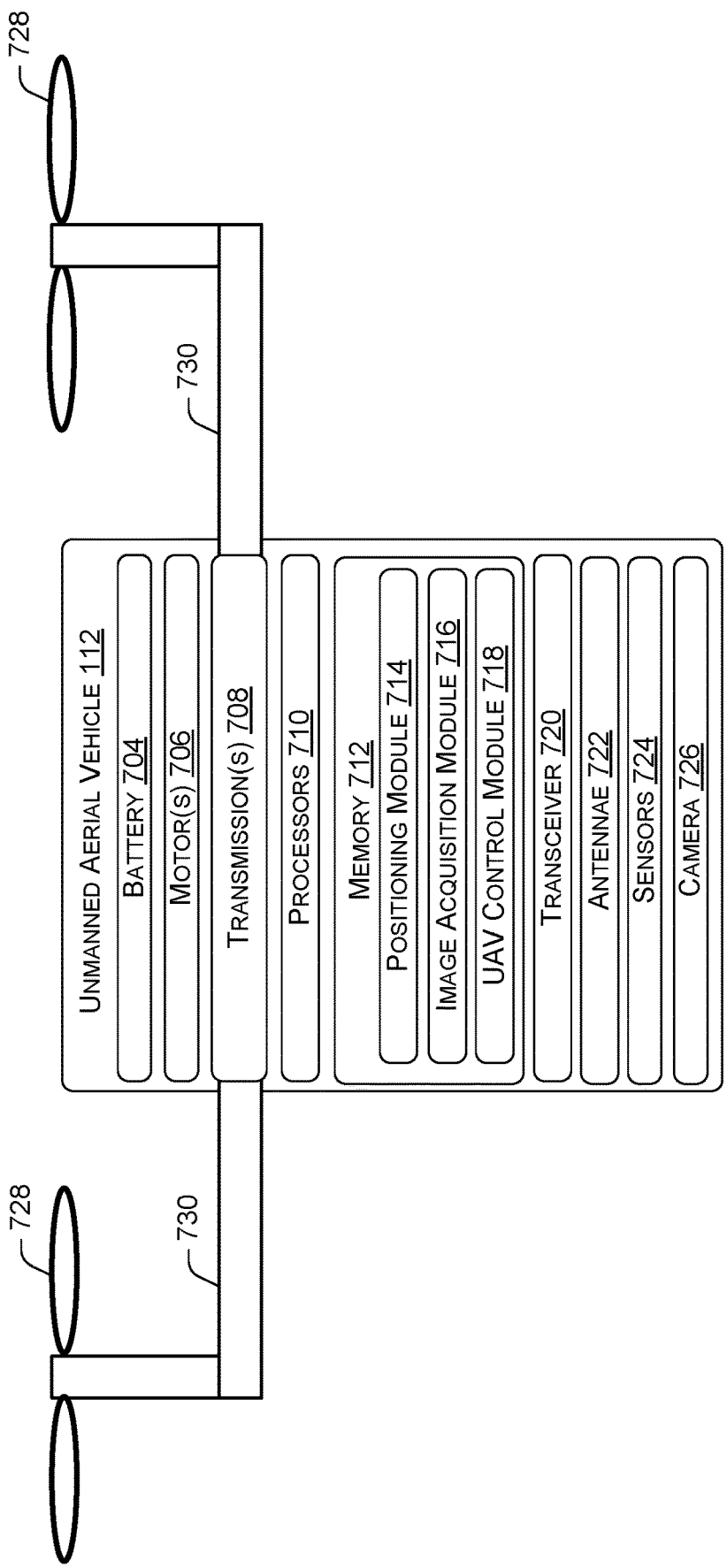
FIG. 7 is an example of a UAV for gathering horticultural feedback.

FIG. 7 is an example of a UAV 112 for gathering horticultural feedback data. The UAV 112 is one possible implementation of an image capture device of FIG. 1. The UAV 112 may include, among other components, one or more batteries 704, motors 706, transmission 708, processors 710, memory 712, transceiver 720, antenna 722, sensors 724, and camera 726. In some embodiments, the antenna 722 include an uplink antenna that sends radio signals to a visual observer device. In addition, there may be a downlink antenna that receives radio signals from the same visual observer device. In other embodiments, a single antenna may both send and receive radio signals. These signals may be processed by the transceiver 720 that is configured to receive and transmit data. The UAV 112 can communicate with other UAVs via the transceiver 720.

The UAV 112 may include one or more processors 710, which may be a single-core processor, a multi-core processor, a complex instruction set computing (CISC) processor, or another type of processor. The UAV 112 may include a power source such as battery 704. The UAV 112 may also include digital signal processors (DSPs), which may include single-core or multiple-core processors. The processors may perform an operation in parallel to process a stream of data that may be provided by various sensors 724.

The UAV 112 may also include network processors that manage high-speed communication interfaces, including communication interfaces that interact with peripheral components. The network processors and the peripheral components may be linked by switching fabric. The UAV 112 may further include hardware decoders and encoders, a network interface controller, and/or a universal serial bus (USB) controller.

In various embodiments, the UAV 112 may include various integrated sensors for measuring metrics to determine plant health, environmental conditions, and/or any human activity or operational metrics in the grow operations. For example, a sensor may be one that is built into the UAV 112. The sensor(s) 724 may transmit data to a visual observer device or an immediate server via the transceiver 720. In various embodiments, the sensors 724 of the UAV 112 may include a light output sensor to measure the intensity of the ambient light. There may be a camera 726 to capture the shape/dimensions of the subject plant. There may be ultrasonic sensors configured to transmit electronic pulses to, inter alia, determine a distance to the canopy of a plant and to measure the shape and the root mass of the plant. Further, there may be an electroconductivity sensor for measuring soil salinity, as well as total dissolved solids (TDS) sensor, pH sensor, and/or soil moisture sensor.

In one embodiment, the data obtained from one or more sensors is transmitted via the transceiver 720 via a wireless IEEE 802 protocol, which may be, but is not limited to, wireless personal area network (WPAN). The transceiver 720 may provide access to a wireless local area network (WLAN) or wireless personal area network (e.g., Bluetooth network). The data obtained from the one or more sensors can be transmitted to the image analysis services to identify issues associated with identified plants and to generate recommendations for potential remediation courses of action. The image analysis services may then communicate the recommendations for potential remedial courses of action to the UAV to perform one or more operations. For instance, the UAV may be configured to deliver fertilizer, water, and/or so forth. In this regard, the UAV may be configured to carry cargo or may comprise a compartment or a receptacle, depending upon embodiments.

The sensors 724 may also include light output sensors, camera(s) 726, and ultrasonic sensors. In one embodiment, the functionality of a light output sensor and the camera 726 are combined into a single sensor. For example, the camera 726 may also function as a light output sensor, thereby obviating the need for an additional light output sensor. The combination of the light output sensor and camera 726 is collectively referred to herein as a light sensor.

The memory 712 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 712 may store various software components that are executable or accessible by the processor(s) 710 of the UAV 112. The various components of the memory 712 may include software and an operating system. Each module may include routines, program instructions, objects, and/or data structures that perform particular tasks or implement particular abstract data types.

The software may enable the UAV 112 to perform functions and control hardware components, including the sensors 724. In various embodiments, the software may provide various functions, such as determining a current position of the UAV, changing a position of the UAV 112 via control of motors 706 and/or transmissions 708, and the acquisition of one or more images via the camera 726.

The UAV 112 includes a body, which is attached to supports 730. The supports 730 may support stanchions that provide a housing for a driveshaft within each of the stanchions. These driveshafts are connected to one or more propellers 726. For example, a driveshaft within stanchion of support 728 is connected to propeller 728.

A power transfer mechanism transfers power from a geared transmission 708 to the driveshafts within the stanchions, such that propeller 728 is turned, thus providing lift and steering to the UAV 112. Geared transmission 708 may contain a plurality of gears, such that a gear ratio inside geared transmission 708 can be selectively changed.

Power to the geared transmission 708 is selectively provided by a motor 706. In one example, the motor 706 is an electric motor which is supplied with electrical power by a battery 704. In another example, the motor 706 is an internal combustion engine, which burns fuel from a fuel tank (not shown). Also included in the UAV 112 is a camera 726, which is able to take digital still and moving pictures under the control of the one or more processors 710. In one example, the UAV control module 718 controls drone mechanisms such as throttles for the motor 706, selectors for selecting gear ratios within the geared transmission 708, controls for adjusting the pitch, roll, and angle of attack of propellers such as propellers 726 and other controls used to control the operation and movement of the UAV 112.

Whether in autonomous mode or remotely-piloted mode, the UAV control module 718 controls the operation of UAV 112. This control includes the use of outputs from the positioning module 714, sensors 724, and/or camera 726. In one example, the positioning module 714 may interface with one or more hardware sensors that determine the location/position of the UAV 112, detect other aerial drones and/or obstacles and/or physical structures around UAV 112, measure the speed and direction of the UAV 112, and provide any other inputs needed to safely control the movement of the UAV 112.

With respect to the feature of determining the location of the UAV 112, this is achieved in one or more embodiments of the present invention through the use of a positioning system such as the positioning module 714, which may be part of the UAV 112, combined with one or more sensors 724 (e.g., accelerometers, global positioning system (GPS) sensors, altimeters, etc.). That is, the positioning module 714 may use a GPS, which uses space-based satellites that provide positioning signals that are triangulated by a GPS receiver to determine a 3-D geophysical position of the UAV 112. The positioning module 714 may also use, either alone or in conjunction with a GPS system, physical movement sensors such as accelerometers (which measure changes in direction and/or speed by an aerial drone in any direction in any of three dimensions), speedometers (which measure the instantaneous speed of an aerial drone), air-flow meters (which measure the flow of air around an aerial drone), barometers (which measure altitude changes by the aerial drone), and/or so forth. Such physical movement sensors may incorporate the use of semiconductor strain gauges, electromechanical gauges that take readings from drivetrain rotations, barometric sensors, and/or so forth. In another example, the positioning module 714 may determine the position/location of the UAV 112 based on one or more beacon signals generated by one or more beacons in the vicinity of a grow operation.

In one aspect, the positioning module 714 may also include a LIDAR system that utilizes the Time of Flight (ToF) method, where the LIDAR system is configured to measure a time delay between the time at which a laser pulse is sent into the environment, and the time at which the reflected signal pulse (i.e., an echo) is detected by the LIDAR system. In yet another example, the positioning module 714 may perform position determination using known time of arrival (TOA) techniques such as, for example, Advanced Forward Link Trilateration (AFLT).

With respect to the feature of sensing other aerial drones and/or obstacles and/or physical structures around UAV 112, the UAV 112 may utilize radar or other electromagnetic energy that is emitted from an electromagnetic radiation transmitter (e.g., transceiver 720), bounced off a physical structure (e.g., a building, bridge, or another aerial drone), and then received by an electromagnetic radiation receiver (e.g., transceiver 720). By measuring the time it takes to receive back the emitted electromagnetic radiation, and/or evaluating a Doppler shift (i.e., a change in frequency to the electromagnetic radiation that is caused by the relative movement of the UAV 112 to objects being interrogated by the electromagnetic radiation) in the received electromagnetic radiation from when it was transmitted, the presence and location of other physical objects can be ascertained by the UAV 112.

With respect to the feature of measuring the speed and direction of the UAV 112, this is accomplished in one or more embodiments of the present invention by taking readings from an onboard airspeed indicator (not shown) on the UAV 112 and/or detecting movements to the control mechanisms on the UAV 112 and/or the UAV control module 718, discussed above.

With respect to the feature of providing any other inputs needed to safely control the movement of the UAV 112, such inputs include, but are not limited to, control signals to direct the UAV 112 to make an emergency landing, and/or so forth.

The UAV 112 further comprises a camera 726, which is capable of capturing still or moving visible light digital photographic images (and/or infrared light digital photographic images) under control of the image acquisition module 716. These images can be provided as the horticultural feedback used to monitor the grow operation as discussed above. In another example, the images may be used to determine the location of the UAV 112 (e.g., by matching to known landmarks), to sense other drones/obstacles, and/or to determine speed (by tracking changes to images passing by) of the UAV 112.

The UAV 112 further comprises sensors 724. Additional examples of sensors 724 include, but are not limited to, air pressure gauges, microphones, barometers, chemical sensors, vibration sensors, etc., which detect a real-time operational condition of the UAV 112 and/or an environment around the UAV 112. Another example of a sensor from sensors 724 is a light sensor, which is able to detect light from other drones, overhead lights, etc., in order to ascertain the environment in which the UAV 112 is operating.

The UAV 112 may also comprise lights that are activated by the UAV 112 to provide visual warnings, alerts, and/or so forth. The UAV 112 may also include a speaker (not shown) to provide aural warnings, alerts, and/or so forth.

Example Computing Device Components for the Visual Observer Device

Figure 8:
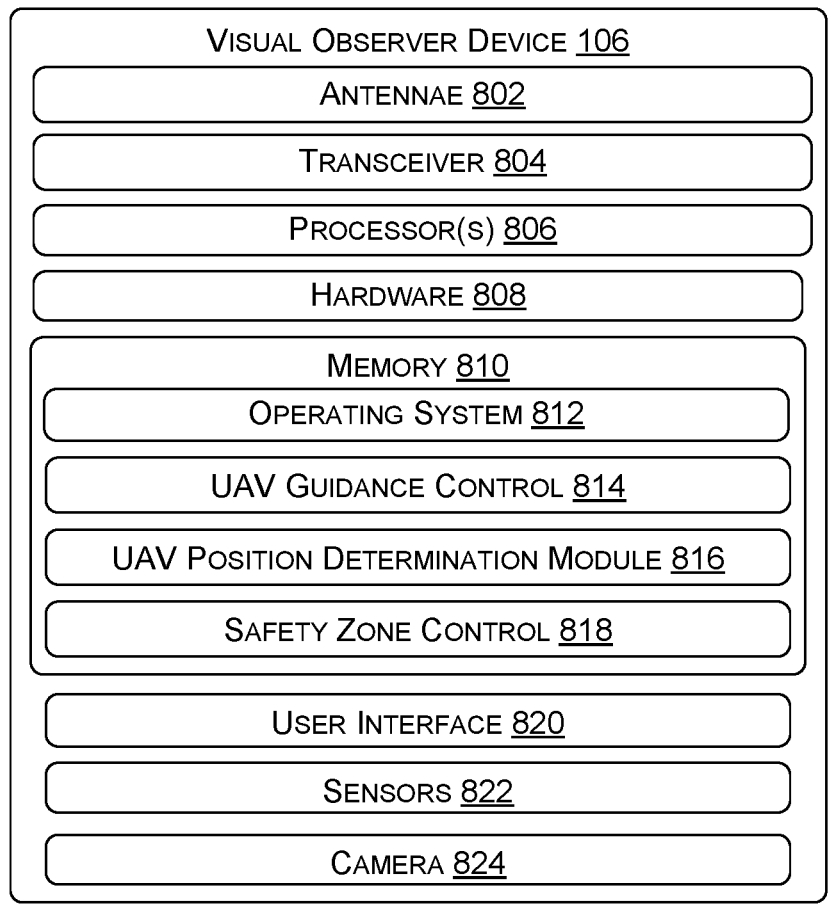
FIG. 8 illustrates an example of a visual observer device for use in a UAS as provided herein.

FIG. 8 illustrates an example of the visual observer device 106 for use in a UAS as provided herein. The visual observer device 106 may operate with a ground based air traffic control (ATC) system. The visual observer device 106 may include, among other components, one or more antennas 802, transceiver 804, one or more processors 806, hardware 808, and memory 810. In some embodiments, the antennas 802 include an uplink antenna that sends radio signals to one or more UAVs 802. In addition, there may be a downlink antenna that receives radio signals from the one or more UAVs 802. In other embodiments, a single antenna may both send and receive radio signals. These signals may be processed by a transceiver 804 that is configured to receive and transmit data.

The visual observer device 106 may include one or more processors 806, which may be a single-core processor, a multi-core processor, a complex instruction set computing (CISC) processor, or another type of processor. The hardware 808 may include a power source and digital signal processors (DSPs), which may include single-core or multiple-core processors. The processors may perform an operation in parallel to process a stream of data that may be provided by various sensors 822.

The hardware 808 may also include network processors that manage high-speed communication interfaces, including communication interfaces that interact with peripheral components. The network processors and the peripheral components may be linked by switching fabric. The hardware 808 may further include hardware decoders and encoders, a network interface controller, and/or a universal serial bus (USB) controller.

In various embodiments, the visual observer device 106 may include various integrated sensors. For example, a sensor may be one that is built into the visual observer device 106. In various embodiments, the sensors 822 of the visual observer device 106 may include a LIDAR system to determine a position of the UAV and/or to monitor the environment in which the UAV is operating. The visual observer device 106 may also comprise a camera 824 to capture images of the grow operation according to a field of view. In one example, the camera 824 is a wide-angle camera to capture a large field of view. In this example, the images captured by the camera 824 may be divided into multiple sub-pictures, where the sub-pictures are processed separately There may also be ultrasonic sensors configured to transmit electronic pulses to, inter alia, determine a distance to the UAV and to obstacles or physical features of the grow operation. In one embodiment, the data is transmitted via the transceiver 804 via a wireless IEEE protocol, which may include WPAN.

The memory 810 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other the memory may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 810 may store various software components that are executable or accessible by the processor(s) 806. The various components of the memory 810 may include software and an operating system 812. Each module may include routines, program instructions, objects, and/or data structures that perform particular tasks or implement particular abstract data types.

The software may enable the visual observer device 106 to perform functions to guide UAVs and control hardware components, including the sensors 822 and camera 824. In various embodiments, the software may provide various functions, such as directly or indirectly instructing the UAV to change its position, when to trigger the capture of an image of a plant, and/or so forth.

For example, a UAV position determination module 816 may be configured to determine a current position of the UAV within the grow operation. In one aspect, the UAV position determination module 816 may utilize one or more computer vision techniques to determine a relative position of the UAV with respect to the visual observer device 106. In one aspect, the UAV position determination module 816 computes control laws that can be applied to the UAV by tracking one or more visual features identified in images captured by the camera 824. The UAV position determination module 816 may include a previously-generated 3D model of the UAV to aid in detecting and tracking the UAV in the images captured by camera 824. By way of example, the 3D model of UAV may include actual dimensions of the UAV, where the actual dimension are compared to the size of the UAV as captured in one or more images to determine a relative position (e.g., distance) of the UAV with respect to the visual observer device 106.

Based on that relative position, the UAV position determination module 816 may then determine a position of the UAV with respect to the grow operation, itself (e.g., a position with respect to a reference point). In another aspect, UAV position determination module 816 may determine the position of the UAV based on one or more LIDAR readings. In yet another aspect, the UAV may be configured to generate a beacon signal, which is detected by the visual observer device 106 to aid the visual observer device 106 in determining the current position of the UAV. In another example, the visual observer device 106 may be configured to receive one or more images captured by the camera of the UAV. The UAV position determination module 816 may then determine a position of the UAV based, at least in part, on the images received from the UAV. By way of example, the UAV position determination module 816 may determine an optical flow from the images to calculate a position and/or speed of the UAV.

The UAV guidance control 814 is configured to generate one or more navigation/control commands to wirelessly transmit to the UAV via transceiver 804. The navigation commands may include commands to control thrust, yaw, pitch, roll, etc., of the UAV such that the UAV follows the predefined path. The predefined path can be within a grow operation or across multiple grow operations. In this way, the UAV can navigate from one operation zone to another operation zone. In another example, the UAV position determination module 816 may transmit the entire path to the UAV such that UAV may autonomously traverse the path. In this example, the transmitted path may comprise a series of waypoints (e.g., coordinates with respect to a reference point) that reflect the desired path.

Regardless of whether the visual observer device 106 provides continuous controls of the UAV or whether the visual observer device 106 provides the path to allow autonomous operations of the UAV, the visual observer device 106 may be configured to still exercise one or more see-and-avoid responsibilities. In this way, the visual observer device 106 can make fly or no fly decisions for each operation zone or grow operation, wherein one operation zone can comprise a fly zone and another operation zone can be a no fly zone. If the visual observer device 106 makes a no fly decision, the visual observer 106 can communicate with the UAV to abort, delay, or pause a mission. For example, the visual observer device 106 may include a safety zone control 818 that is configured to scan the area around the UAV for potentially conflicting traffic (e.g., workers, other UAVs, vehicles, robots, etc.). Furthermore, the safety zone control 818 may restrict the flight of the UAV to within a visual line-of-sight limit. If the safety zone control 818 detects an impending hazard, the safety zone control 818 may be configured to control the UAV to take remedial action. For example, the safety zone control 818 may send an emergency stop command to the UAV to trigger the UAV to land, pause, and/or to send an updated navigation command to the UAV to alter a current path of the UAV. A UAV landing/charging pad may be located in an area that allows a safe flight path to and from the grow operation. For example, a landing/charging pad may be located in the rafters above the grow operations.

Example Computing Device Components for the Central Controller

Figure 9:
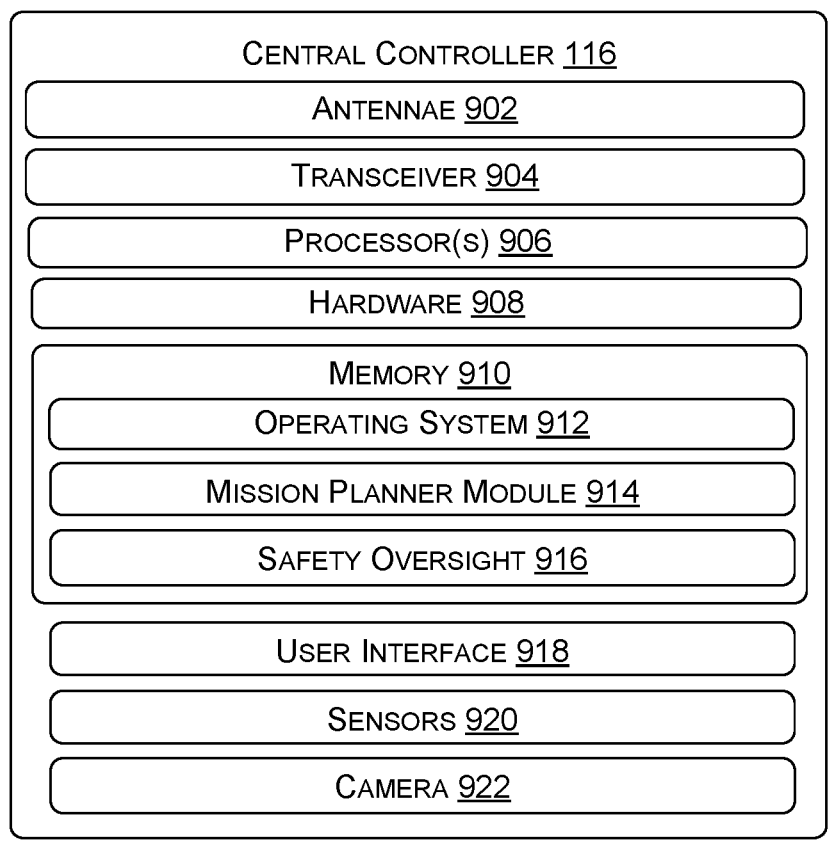
FIG. 9 illustrates example components of the central controller for managing UAS operation.

FIG. 9 illustrates example components of the central controller 116. The central controller 116 may be operatively connected to an ATC system. The central controller 116 may include one or more antennas 902, transceiver 904, one or more processors 906, hardware 908, and memory 910. In some embodiments, the antennas 902 include an uplink antenna that sends radio signals to one or more UAVs. In addition, there may be a downlink antenna that receives radio signals from the one or more UAVs. In other embodiments, a single antenna may both send and receive radio signals. These signals may be processed by a transceiver 904 that is configured to receive and transmit data.

The central controller 116 may include one or more processors 906, which may be a single-core processor, a multi-core processor, a complex instruction set computing (CISC) processor, or another type of processor. The hardware 908 may include a power source and digital signal processors (DSPs), which may include single-core or multiple-core processors. The processors may perform an operation in parallel to process a stream of data that may be provided by various sensors 920.

The hardware 908 may also include network processors that manage high-speed communication interfaces, including communication interfaces that interact with peripheral components. The network processors and the peripheral components may be linked by switching fabric. The hardware 908 may further include hardware decoders and encoders, a network interface controller, and/or a universal serial bus (USB) controller.

In various embodiments, the central controller 116 may include various integrated sensors 920. For example, a sensor 920 may be integral to the central controller 116. In various embodiments, the sensors 920 of the central controller 116 may include a LIDAR system to determine the position of the UAV and/or to monitor the environment in which the UAV is operating. The sensors 920 can also comprise ultrasonic sensors configured to transmit electronic pulses to determine a distance to the UAV and to obstacles or physical features of the grow operation. The central controller 116 may comprise a camera 922 to capture images of the multiple grow operations according to a field of view. In one example, the camera 922 is a wide-angle camera to capture a large field of view. The images captured by the camera 922 may be divided into multiple sub-pictures, where the sub-pictures are processed separately. In one embodiment, the data obtained via the sensors 920 and/or the camera 922 is transmitted via the transceiver 904 via a wireless IEEE 802 protocol, which may be WPAN.

The memory 910 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other the memory 910 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 910 may store various software components that are executable or accessible by the processor(s) 906. The various components of the memory 910 may include software and an operating system 912. Each module may include routines, program instructions, objects, and/or data structures that perform particular tasks or implement particular abstract data types. The software may enable the central controller 116 to perform functions and control hardware components, including the sensors 920 and camera 922.

In various embodiments, the software may provide various functions, such as directly or indirectly instructing the UAV to change its position and/or perform an emergency stop. For example, a mission planner module 914 may be configured to provide a mission to one or more UAVs based at least on data and/or images collected via the UAVs, an image capture device, a luminaire feedback device, a visual observer device, and/or the central controller 116. In one example, the mission planner module 914 may communicate with one or more visual observer devices to implement one or more missions. In various embodiments, the mission planner module 914 receives, from the image analysis services, identified issues associated with identified plants, plant artifacts, or plant identifiers, and/or recommendations for a remedial course of action based at least on the potential issues for the one or more plants, in order to select a mission. The mission planner module 914 can communicate with a database that stores a reference table from which a mission may be selected based at least one the diagnosis and/or recommendation received from the image analysis services.

The mission can comprise one or more operations for the UAV to perform. For instance, a mission can comprise a data collecting mission, a delivery operation, and/or other related grow operation missions. Additionally, the mission can specify the operation zone or the grow operation in which the UAV is to navigate. In this regard, the mission planner module 914 can provide a path for one or more of the UAVs for their respective operation zone or grow operations and/or a time/date of when the UAVs are to fly their respective paths. In one example, the mission planner module 914 may communicate with one or more visual observer devices to implement one or more paths.

The mission planner module 914 can also coordinate missions for one or more UAVs in multiple operation zones or grow operations. In this regard, the mission planner module 914 can provide a first mission to a first UAV in a first operation zone or grow operation and a second mission to a second UAV in a second operation zone or grow operation. Additionally, or alternatively, the mission planner module 914 can coordinate missions for one or more UAVs in a single operation zone or grow operation. In this regard, the mission planner module 914 can provide a first mission to a first UAV in an operation zone or grow operation and a second mission to a second UAV in the same operation zone or grow operation. The first UAV and the second UAV can perform respective missions concurrently or sequentially. In various embodiments, the second mission can depend on the outcome of the first mission. In such scenario, the first UAV and the second UAV may communicate with each other to coordinate respective missions and reduce interference. In various embodiments, the mission planner module 914 can provide multiple missions to a UAV in one or more operation zones or grow operations. In this regard, the UAV can complete a first mission in a first operation zone or grow operation and then a second mission in the same operation zone or grow operation or in a second operation zone or grow operation.

The mission planner module 914 may also receive the current status of the UAV to determine whether the UAV is operational. If one of the UAVs is not operational (e.g., malfunction, low battery), the mission planner module 914 can communicate with the UAV to abort mission and provide the aborted mission to a second UAV that is operational. In this regard, the mission planner module 914 can select the second UAV based at least on the second UAV's real-time location, the second UAV's mission, and/or so forth. More specifically, the mission planner module 914 can select the second UAV to perform the aborted mission if the second UAV is located in or near the operation zone or grow operation in which the mission is to be performed. In another example, the mission planner module 914 can select the second UAV to perform the aborted mission if the second UAV is already tasked to perform a similar mission.

The central controller 116 further comprises a safety oversight module 916. In one aspect, safety oversight module 916 may provide further sense and avoid tasks for ensuring safe operation of the UAVs. In some aspects, the safety oversight module 916 is configured to scan the area around the UAV for potentially conflicting traffic. In particular, safety oversight module 916 may scan multiple grow operations and/or the area around and between the grow operations (e.g., areas not covered by the UAVs). In this regard, the safety oversight module 916 can make fly or no fly decisions if one or more conditions are met. More specifically, if the safety oversight module 916 identifies conflicting traffic, the safety oversight module 916 can provide instructions to the UAV to abort a mission, pause the mission, or delay the mission. If the safety oversight module 916 determines that there is no longer a conflicting traffic, the safety oversight module 916 can instruct the UAV to resume the mission or another UAV to complete the mission.

In some examples, the safety oversight module 916 may be configured to communicate with and/or alert a municipal, local, or other air traffic controller as to one or more issues with a UAV. For example, assuming that a UAV malfunctions and flies off course, such that local control of the UAV is lost, the safety oversight module 916 may be configured to alert an online data reporting portal of the National Airspace System (NAS) that a UAV has been lost. The alert may include information such as the type and/or module of the UAV as well as the last known position and/or flight path.

Exemplary Plant State Vector

Figure 10:
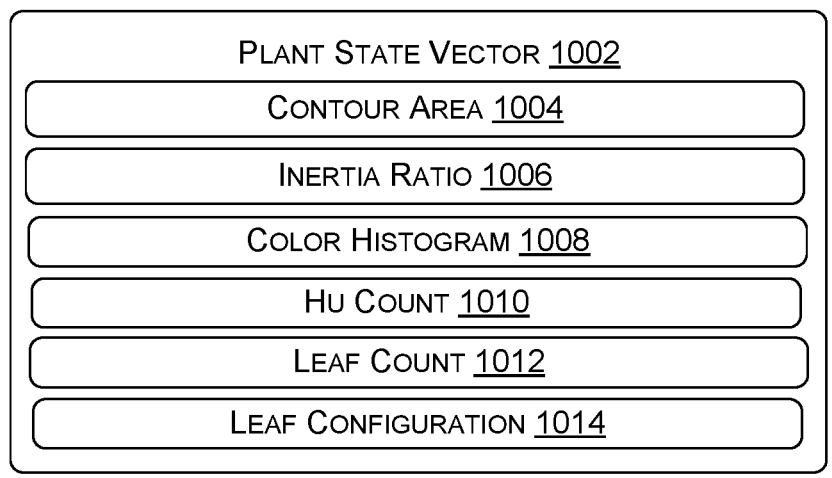
FIG. 10 is an exemplary plant state vector for object recognition based horticultural feedback analysis.

FIG. 10 shows a diagram of an exemplary plant state vector 1002. The plant state vector 1002 is a data representation that captures the state of a plant as interpreted from an image. During image preprocessing, classification, and identification, image information is extracted via various image operations. The image information not only can be persisted in a plant state vector such that the information need not be recalculated, but also that information can act as a proxy for the plant during comparison operations. By comparing at least a portion of the plant state vector, the image analysis service may determine whether plants represented in different images should be analyzed together. The plant state vector 1002 comprises the contour area 1004, inertia ratio 1006, color histogram 1008, Hu count 1010, leaf count 1012, and leaf configuration 1014 as calculated during preprocessing, classification, and identification.

The contour area 1004 is a value from performing contour tracing, a technique used in feature recognition. Specifically, a tessellation is overlaid over an image, and a threshold color difference, and/or a border pixel width, are specified to be interpreted as the border between features in an image. The contour area 1004 is performed during classification when the image is analyzed to identify plant and non-plant features, as well as during identification, where artifacts of the plant are identified. Upon performing a contour trace, the contour area is the area of the image known to represent the plant.

The inertia ratio 1006 is a value from performing shape factor analysis, a technique used in determining how much a shape in an image deviates from an expected shape. For example, a portion of a plant may be identified as an artifact. When the artifact deviates from an expected shape, the deviation may be an indication of an issue with the plant. The inertia ratio 1006 is a value calculated to indicate the degree of deviation. Specifically, it provides a measure of the long-ness of a shape with respect to the degree of symmetry. For example, it can indicate how oval, a circular shape is.

A color histogram 1008 is a pixel count organized into a histogram, where the histograms variables represent different colors. The colors may simply be red-green-blue or may be of a greater spectrum of colors. In one embodiment, the contour area 1004, inertia ratio 1006, and the color histogram 1008 may be used to determine the likeliness that a portion of an image is to be considered representing a plant. For example, the following calculation may be used to rank image portions as likely representing a plant:

$$\text{Rank Value} = (\text{contour area} \times \text{inertia ratio}) \times [\text{green}/(\text{red} + \text{blue})]$$

For the plant state vector, the contour area 1004, inertia ratio 1006, and the color histogram 1008 may be stored on a per image portion basis, or alternatively may be aggregated into a single contour area, inertia ratio, and color histogram for all the portions of the image deemed to represent a plant.

The Hu count 1010 is a count of Hu moments which are a form of image moments in image processing. An image moment is a measure of pixel intensity. In the alternative, the actual moment calculations, rather than just the count, may be stored and image moment calculations need not be Hu moments.

The leaf count 1012 is a value of the count of leaves (or needles) in the portions of an image deemed to be a plant. The leaf configuration 1014 is a representation of the position and orientation of the leaves (or needles) in space. Image analysis can identify the configuration of an arbitrary branch structure. Accordingly, a plant state vector may alternatively include vein structure of leaves, branches of the plant, and the root structure of a plant. In general, branching for leaves, needles, branches, and roots may be stored as a tree structure where edges store lengths and nodes store the identity and orientation of edges corresponding to branches in space.

In one example, image A and image B may have similar metadata pertaining to a plant from the same greenhouse. In this case, a query may be applied to an image database and both images may be retrieved, and the plants in image A and image B may be understood to be similarly situated so that they should be analyzed together. In this regard, the plants in image A and image B may be expected to have similar degrees of health because they are similarly situated.

The plant state vector 1002, either alone, or in conjunction with image metadata, can find comparable plants to a finer degree of resolution. If the plant state vector 1002 includes a branch analysis of a plant in an image or includes a color histogram of the portions of the image relating to a plant, similarly situated plants can be retrieved in a query, even if they are located in different greenhouses or grown in different times. In this way, a plant suffering from rot in a first greenhouse may be retrieved along with another suffering from rot in a second greenhouse, grown at a different time. As with the previous example, a grower may take action to determine if there were similar causes. In some cases, data related to the plant state vector 1002 can be stored in a database, which may also contain suggestions for causes of an identified issue. Thus, analysis by the grower may be aided by the database or automated.

There are many potential values that may be used for the plant state vector 1002. Generally, the values chosen are to be mathematically transformational and translational invariant. Exemplary types of mathematical transformations are scaling, skewing rotation, reflection over a point and reflection over an axis. Additionally, a mathematical translation may consider a movement of an object in a particular direction through space. Specifically, even if a plant is moved, or rotated in the time between different images, the plant should be identifiable as the same plant.

Example Processes

FIGS. 11 through 15 present illustrative processes 1100-1500 for providing object recognition horticultural based feedback analysis. The processes 1100-1500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 1100-1500 is described with reference to FIGS. 1 through 10.

Figure 11:
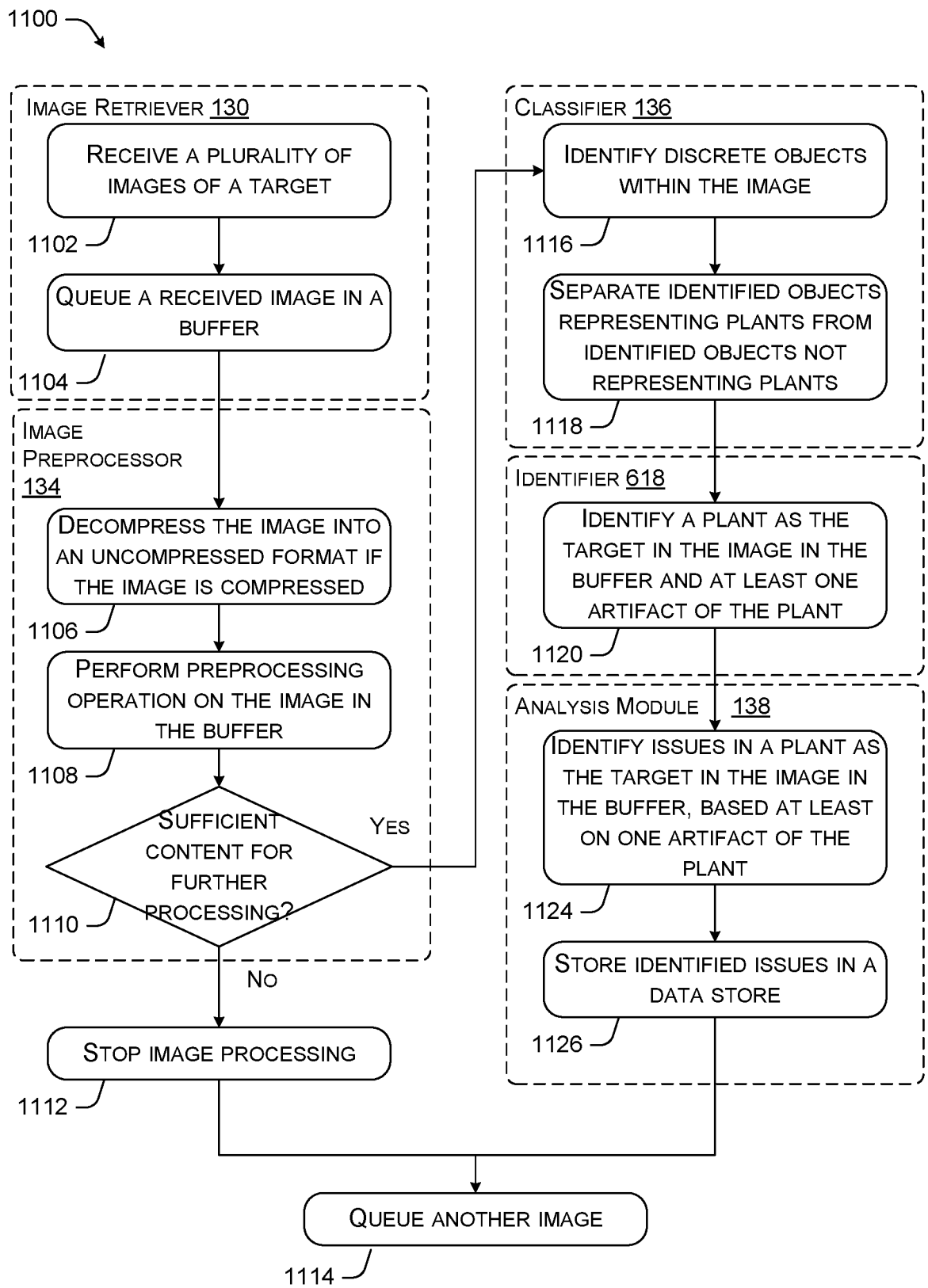
FIG. 11 is an exemplary flow chart of object recognition based horticultural feedback analysis.

FIG. 11 is a flow chart 1100 of the generalized workflow for the ORB-HFA. At block 1102, an image retriever 130 receives an image from an image capture function or an image capture device. Because of the relatively large amount of bandwidth used by image and/or video data, the image retriever 130 may perform a negotiated bandwidth transfer of images. For instance, the image retriever 130 may query an image capture function for the size of its image memory cache. In response, the image retriever 130 may calculate the sum total image memory cache of all image capture functions attempting to upload images. The image retriever 130 may then schedule uploads based on available bandwidth. Additionally, or alternatively, the image retriever 130 may prioritize uploads or manually schedule uploads. In this way, image transfer may be performed during times with otherwise minimal network traffic and not interfere with another network use.

At block 1104, the image retriever 130 stores at least one image for processing in an image buffer. Once buffered, the image is preprocessed. At block 1106, the image preprocessor 134 can decompress and/or decrypt the buffered image into its native format. In some cases, the native format of the buffered image may not be usable by preprocessing algorithms, identifier algorithms, and/or other algorithms. In this case, the image preprocessor 134 may convert the buffered image from its native format to the applicable file format or a predetermined file format (e.g., Joint Photographic Experts Group (JPEG), Tagged Image File Format (TIFF), Graphics Interchange Format (GIF), Windows bitmap (BMP), Portable Network Graphics (PNG), etc.).

At block 1108, the image preprocessor 134 may apply one or more preprocessing algorithms. Preprocessing algorithms may be directed to filtering and/or enhancing, which increases contrast, pixel intensity, and other attributes to optimize image recognition. Preprocessing algorithms may also be directed to eliminating noise. In general, preprocessing algorithms are directed to an image processing operation that will aid subsequent classification and identification image processing. Exemplary image processing algorithms may include the pre-calculation and generation of a red-green-blue histogram or other histograms with pixel color counts as a variable. Additionally, or alternatively, the histogram may be a hue-luminance-saturation histogram of colors. The generated color histogram may be stored in a plant state vector. In some cases, the color histogram pre-calculation may be used with an adaptive histogram aggregating information from a plurality of images.

Other exemplary image processing algorithms may include a count of mathematical morphological operations. Mathematical morphology is an application of mathematics to image processing to determine the shape and spatial attributes such as size, convexity, connectivity, and geodesic distance. These attributes may be manipulated using morphological operations such as erosion, dilation, opening, and closing. For example, an algorithm may count the number of morphological opens and closes to help determine sub-shapes in an image. Other exemplary image processing algorithms may apply a transform to the image to make the image clearer or otherwise easier to discern features during classification and identification. One example algorithm applies a Gaussian function on a per pixel basis in an image. In this way, pixels with high contrast with respect to neighboring pixels are attenuated to lower contrast base on the Gaussian function.

Other exemplary image processing algorithms may apply filters to the image which, while removing information, increase contrast to better discern features during classification and identification. One example algorithm is Otsu segmentation. Specifically, Otsu segmentation is the setting of one or more filters using a color attribute such as hue, luminance or saturation, or alternatively red-green-blue value, to segment an image into zones, each zone having its own color in high contrast with respect to neighboring segments. Otsu segmentation generally transforms an image into grayscale zones. The resulting image may then be used as a filter or stencil with respect to the original image.

At decision block 1110, the image preprocessor 134 may determine whether the buffered image comprises sufficient information for an ORB-HFA application. For example, the image preprocessor 134 may determine that the image buffer does not comprise sufficient information for analysis if the image buffer comprises a partial file or a corrupt file. In various embodiments, corrupted files may be preprocessed by applying pre-processing algorithms in an attempt to repair. If a buffered image does not comprise sufficient information ("no" response from the decision block 1110), the buffered image is discarded as indicated in block 1112. Similarly, in some cases, preprocessing may result in a buffered image that comprises insufficient information. For example, the generated color histogram indicates that the image is mostly dark, suggesting an obstructed camera. By way of another example, during Otsu segmentation, it may appear that the image does not contain enough segments indicating an image where sub-shapes could not be determined. To avoid the introduction of erroneous or corrupted images into classification and identification, the image preprocessor 134 may discard images as indicated in block 1112.

If a buffered image comprises sufficient information ("yes" response from the decision block 1110), the buffered image is classified. Classification is the identifying of plant versus non-plant portions of the image. At block 1116, the classifier 136 identifies discrete objects within the buffered image. The image preprocessor algorithms may generate a list of objects in the image by applying a segmentation algorithm such as Otsu segmentation. Accordingly, different portions of the image may be identified as discrete objects or contiguous sets of pixels corresponding to an item whose image was captured in the buffered image. If segmentation is not completed by the image preprocessor 134, then the classifier 136 may generate the discrete object list.

At block 1118, the classifier 136 may classify the discrete objects into plant and non-plant objects. Upon obtaining a discrete object list for the buffered image, the objects may be sorted by size, from the largest to the smallest. A predetermined threshold may be specified for the maximum size and the minimum size. In this way, only the image objects of a certain size within the predetermined threshold may be processed to reduce the processing load.

A rank value is calculated for the N largest objects. The rank value generally relates to an indication that a discrete object's shape and color corresponds to an expected plant feature. After calculation of the rank values, the top X values, X being a predetermined threshold, will be deemed to be representing a plant in the image. In this way, only discrete objects deemed to represent the plant are differentiated from discrete objects deemed not to represent the plant in the buffered image.

After classification, the portions of the buffered image deemed to represent a target, or an item of interest in the image is processed by the identifier software component and identifier algorithms to identify the identity of the target in the image. While the target may be any item captured in the image, a person, a machine, and the like, generally the target will be a plant. The degree of identification may simply be to identify the genus and species of the plant in the buffered image. However, this information may also be in metadata already. The identification may also be of a particular plant e.g. the ninth red rose shrub out of a lot of twelve. Because information is stored on a per plant basis, some identification algorithms may determine that an object is the same plant as in another image, but just moved or rotated.

At block 1120, artifacts comprising the plant in the buffered image are identified by the identifier 618. More specifically, the identifier 618 may apply one or several algorithms to segment the portions of the buffered image deemed to represent a plant as opposed to the entire buffered image. The portions may then be segmented, for example using Otsu segmentation. Where segments and attributes of the segments such as morphological attributes and color match a plant, a positive identification of the plant may be achieved.

Because the plant may comprise a plurality of discrete objects, not only can the plant be identified, but discrete objects comprising the plant may also be identified. These discrete objects, such as petals and leaves comprise artifacts of the plant. Prior to segmentation, the identifier software component may apply additional preprocessing specific to the discrete objects deemed to represent a plant. Some of these preprocessing make use of adaptive and iterative techniques.

At block 1124, the analysis module 138 may identify issues associated with the identified plant if the artifacts of the plant deviate from an expectation. At block 1126, identified issues may be stored in a data store. Additionally, the original buffered image, metadata of the image, a plant state vector, data generated during preprocessing and other processing, and identified issues may be stored together in the data store. Upon processing the image to identify a plant, the plant's artifacts, and/or potential issues with the plant, processing may continue by queuing another image as indicated in block 1114.

Notwithstanding FIG. 11, image processing is not necessarily linear. In some cases, image processing may involve the aggregation, or the statistical combining of information from multiple images to create a baseline or basis to compare images and artifacts in images. Such a creation of a baseline, where the baseline may change as new images are processed is called adaptive processing.

Figure 12:
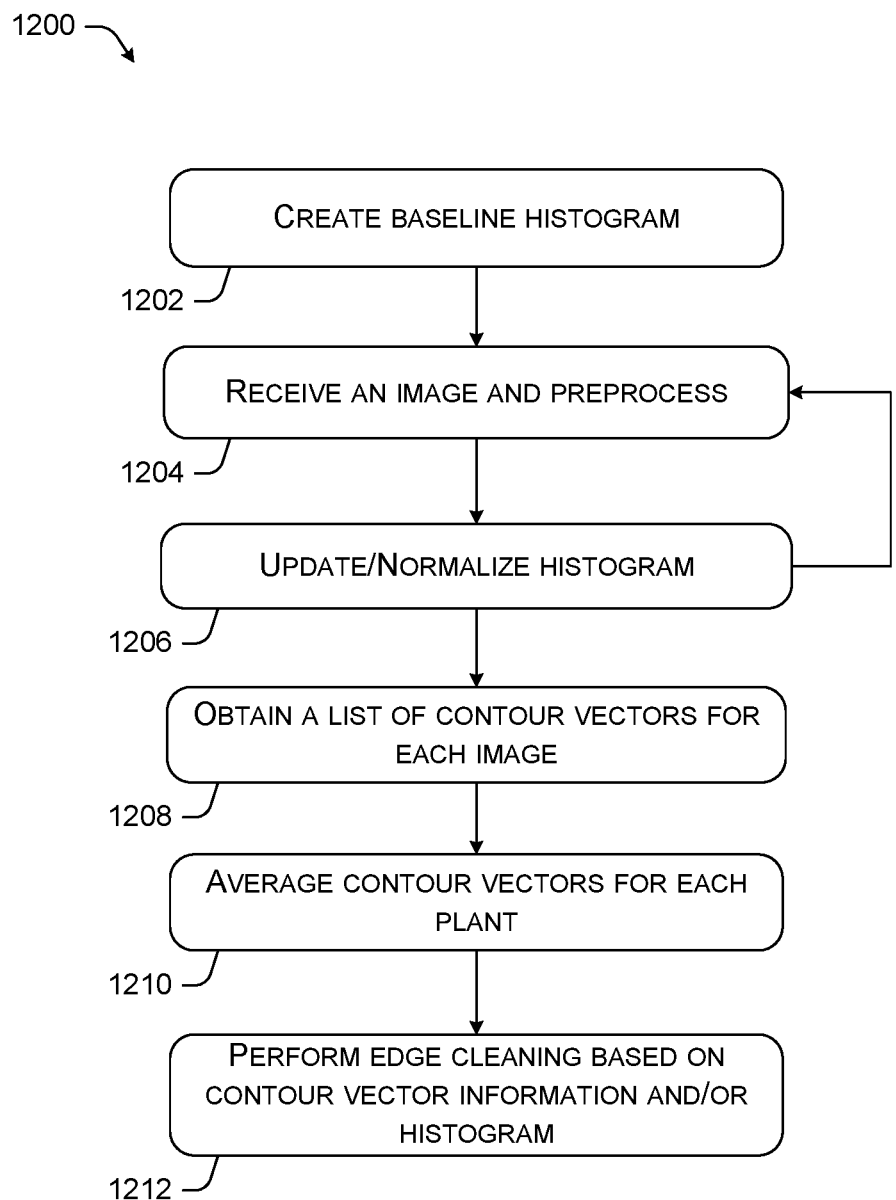
FIG. 12 is an exemplary flow chart of identification processing for object recognition based horticultural feedback analysis.

FIG. 12 is a flow chart 1200 of an example of adaptive processing. Specifically, a color histogram is generated that captures statistically aggregated information over multiple images, and the adapting histogram is used during identification to refine artifacts of plants in an image. This process may be referred to as edge cleaning. Edge cleaning may be performed by the identifier software component or may be performed by a separate software component.

At block 1202, a baseline histogram is initialized. The variables of the histogram may be set to zero or a prior histogram may be used. The baseline histogram may be adapted by adding information from additional images during processing. At block 1204, an image is retrieved, buffered, and preprocessed. During preprocessing, histogram information, such as red-green-blue histogram information and/or hue-luminance-saturation information is extracted from the buffered image.

At block 1206, the extracted histogram information is incorporated into the baseline histogram. The extracted histogram information may be added to the baseline histogram on a per variable basis. Additionally, or alternatively, the added histogram information may be weighted. In this way, the baseline histogram adapts into a statistical aggregated of multiple images to conduct updates or normalization. The baseline histogram may be calculated over a large number of images. When the histogram is deemed to have a critical mass of information, individual images may be processed. The histogram can be continuously updated and/or normalized. At block 1208, a list of contour vectors is created. At block 1210, the contour vectors are averaged for each plant in the image.

At block 1212, the contour information and/or the baseline histogram, after the baseline histogram is deemed to have sufficient information, is used to perform edge cleaning, or preprocessing steps to enhance artifacts of the plant in the buffered image. At this point, the buffered image is ready for identification by the identification software component. The identification software component may calculate the ranking value of artifacts.

After identification of a plant and artifact of the plant, the plant is analyzed. The analysis may be static, specific to a single image, or sequential, an analysis of multiple images over time. Many times, image information extracted or generated from an image is aggregated with other static analysis information from other images which subsequently are collectively subjected to sequential analysis.

Figure 13:
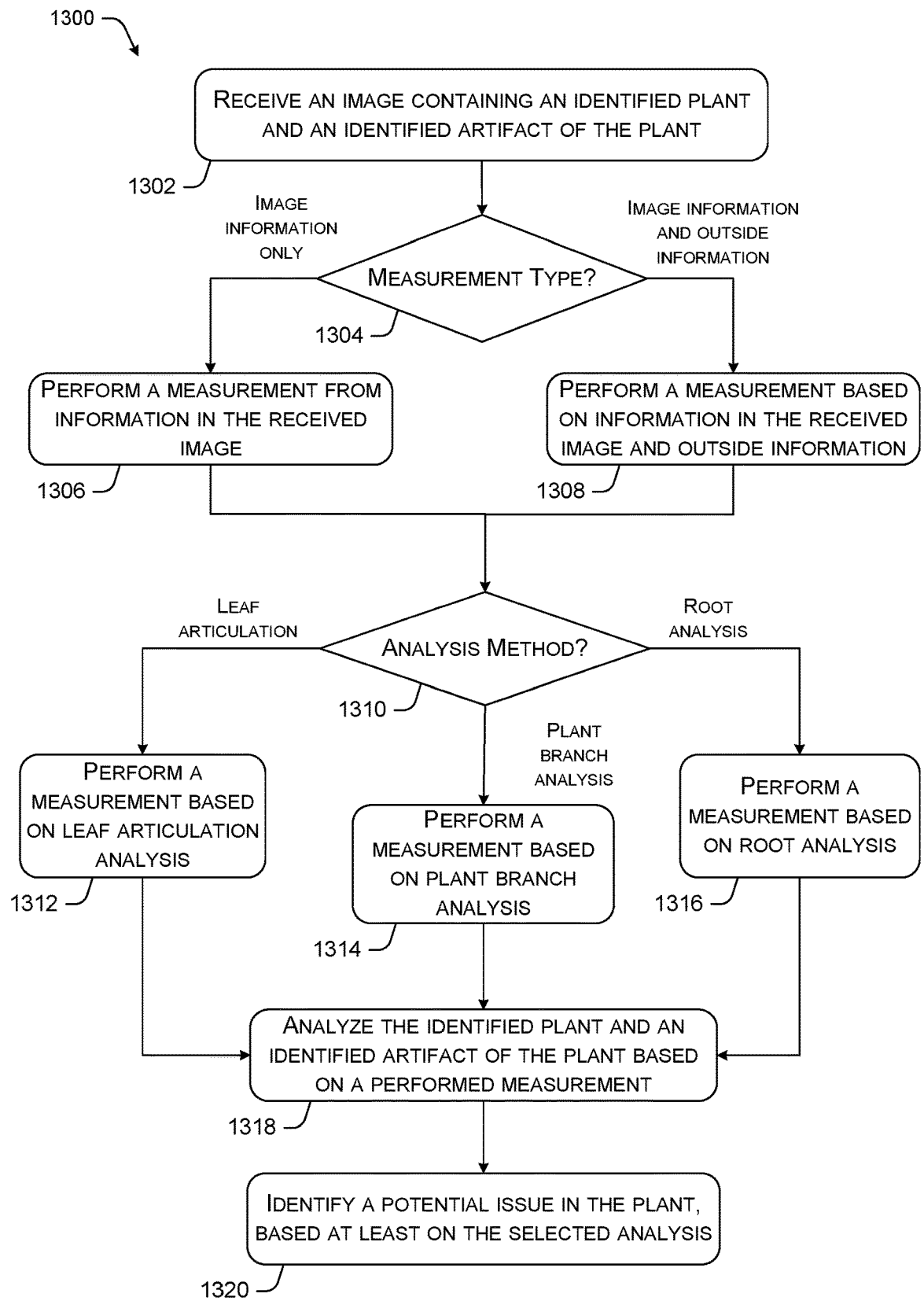
FIG. 13 is an exemplary flow chart of static analysis via object recognition based horticultural feedback analysis.

FIG. 13 is a flow chart 1300 of a framework for static analysis. Static analysis is the analysis with a single image as its subject. At block 1302, the image analysis service receives an image comprising a plant and an artifact of the plant that has been identified. Because the analysis involves a single image, some analyses may supplement information. At decision block 1304, the image analysis service determines whether measurement type includes image information only or image information and outside information. Examples of outside information include metadata, administrative intervention, information within the plant state vector, and/or a pre-calculated histogram. If the measurement uses only information in the image, then the measurement is performed as indicated in block 1306. Otherwise, the measurement, including the outside information as well as information in the image is performed as indicated in block 1308.

At decision block 1310, the measurement is analyzed using various analysis method. In the illustrated embodiment, the analysis includes leaf articulation, plant branch analysis, and root analysis. At block 1312, the image analysis service performs a measurement based on leaf articulation analysis. Leaf articulation analysis is the study of the orientation of artifacts identified as leaves of a plant. Generally, leaves are expected to turn towards the source of light. Where leaves fail to do so, or not enough leaves do so, an issue of the plant may be identified.

At block 1314, the image analysis service performs a measurement based on plant branch analysis. Plant branch analysis is the generation of a computer representation of the size and orientation of the branches of a plant. A similar analysis may be made of roots at block 1316 or even the veins on a leaf. General branch analysis is also known as component modeling. Leaf articulation at block 1312, plant branch analysis at block 1314 and root analysis at block 1316 may be performed at the same time or in a sequential manner.

Leaf articulation, plant branch, and root analysis measurements may be simply made and analyzed in isolation. At block 1318, the image analysis service analyzes the identified plant and an identified artifact of the plant based on a performed measurement. At block 1320, the image analysis service identifies a potential issue in the plant, based at least on the selected analysis. The identified issue may be stored in a data store for subsequent reporting. Additionally, or alternatively, the results of the static analysis may be compared to subsequent analyses of the plant as part of a sequential analysis.

Figure 14:
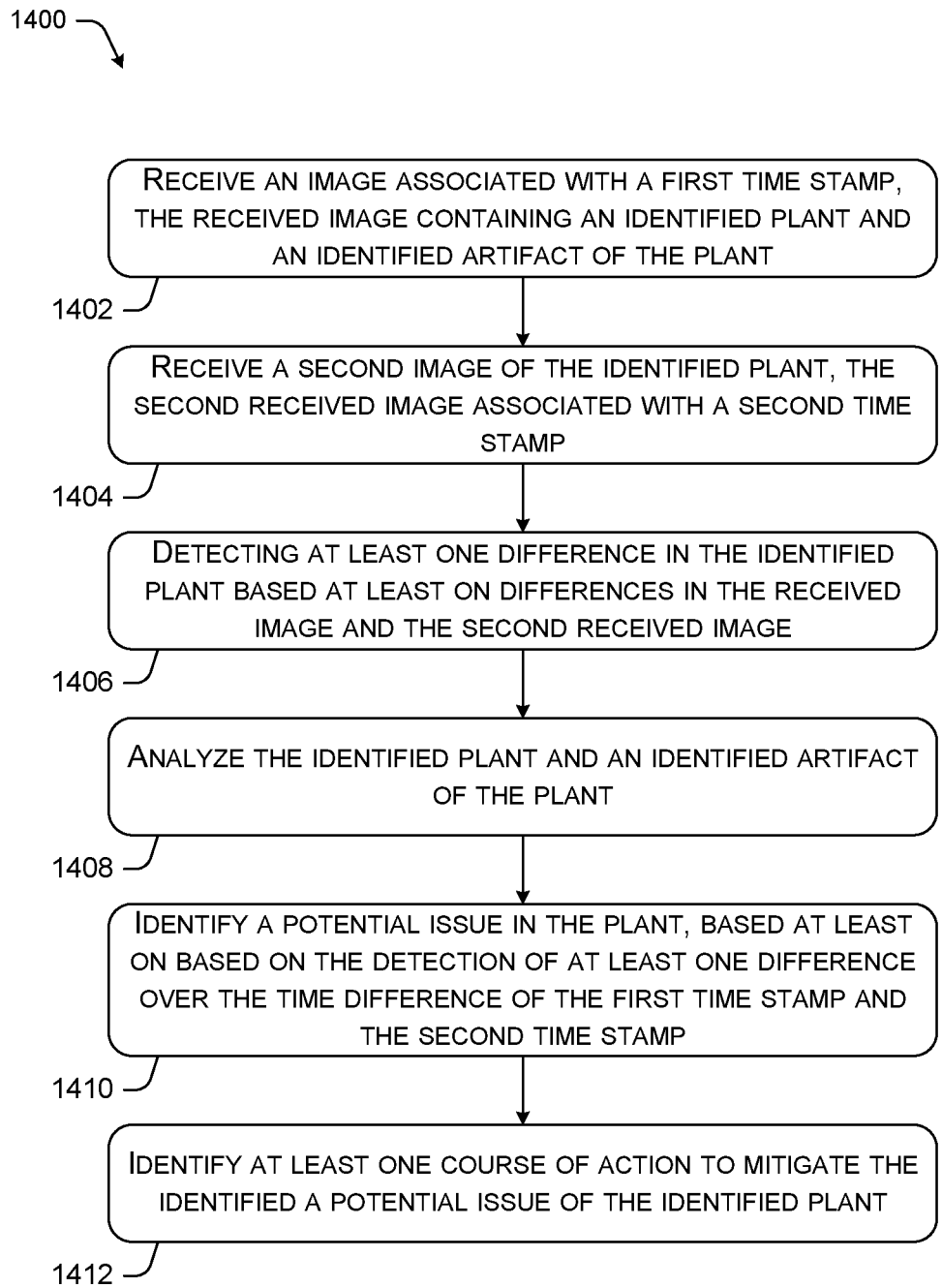
FIG. 14 is an exemplary flow chart of sequential analysis via object recognition based horticultural feedback analysis.

A sequential analysis differs from a static analysis in that sequential analysis makes use of multiple images over time. FIG. 14 is a flow chart 1400 of a framework for sequential analysis. At block 1402, the image analysis service receives a first image comprising a plant and at least one plant artifact. The image can be time stamped when received at the image analysis service. At block 1404, the image analysis service receives a second image comprising the plant and at least one plant artifact with a second time stamp.

At block 1406, the two images are compared and differences are identified. It is noted, however, that sequential analysis is not limited to two images. Additional images may be used. The images themselves may be compared as well as any metadata associated with the images and any pre-calculated or pre-generated information on the images including the plant state vector. For example, if a branch representation was generated as part of branch analysis for either of the images, a comparison of the images may include a comparison of the respective branch analyses. In this regard, information on the image may be generated from the metadata and/or pre-calculated or pre-generated information, and that information may be compared. For example, the color information in the plant state vector may be used to generate values for both the first image and the second image, and the color information may be compared. Because the images include information of artifacts comprising the respective plants, the comparison between the two images may be made of the plant as a whole and on a per artifact basis.

At block 1408, identified differences between the two images are analyzed. For instance, continuity analysis may be performed, which is the identification of particular causes for a change. In another example, validation analysis may be performed to confirm that the plants compared are indeed the same plant. In this way, comparing the two images is validated. One embodiment of validation analysis is to perform a 2+1 analysis. For the plant in the first image and the plant in the second image, a vector is generated for each plant image. Because the images are generally captured via the same image capture device, a measurement of the Euclidean distance between the plants may be calculated. Where the distance is over a predetermined threshold, a determination of whether the plant was simply moved and/or rotated may be made, thereby confirming that the plant identified in the image and second image is the same plant, and may, therefore, be compared.

At block 1410, issues may be identified based at least on the analysis. Where changes in values, such as motion, are above a predetermined threshold, continuity analysis, or the identification of causes of the change may be brought to bear. Data store may contain a database of image artifacts corresponding to likely diagnoses as well as potential remediation courses of action. At block 1412, the database may be searched for a diagnosis and/or remediation course of action. In various embodiments, the data store may comprise a solutions table from which a remediation course of action may be selected based at least one the diagnosis.

In various embodiments, trends across an entire grow operation may be detected using a plurality of images. Accordingly, in addition to comparing images of the same plant, comparisons may be made of similarly situated plants. For example, other plants of the same species in the same grow operation, may be searched for indications of any identified issues in a single plant.

Figure 15:
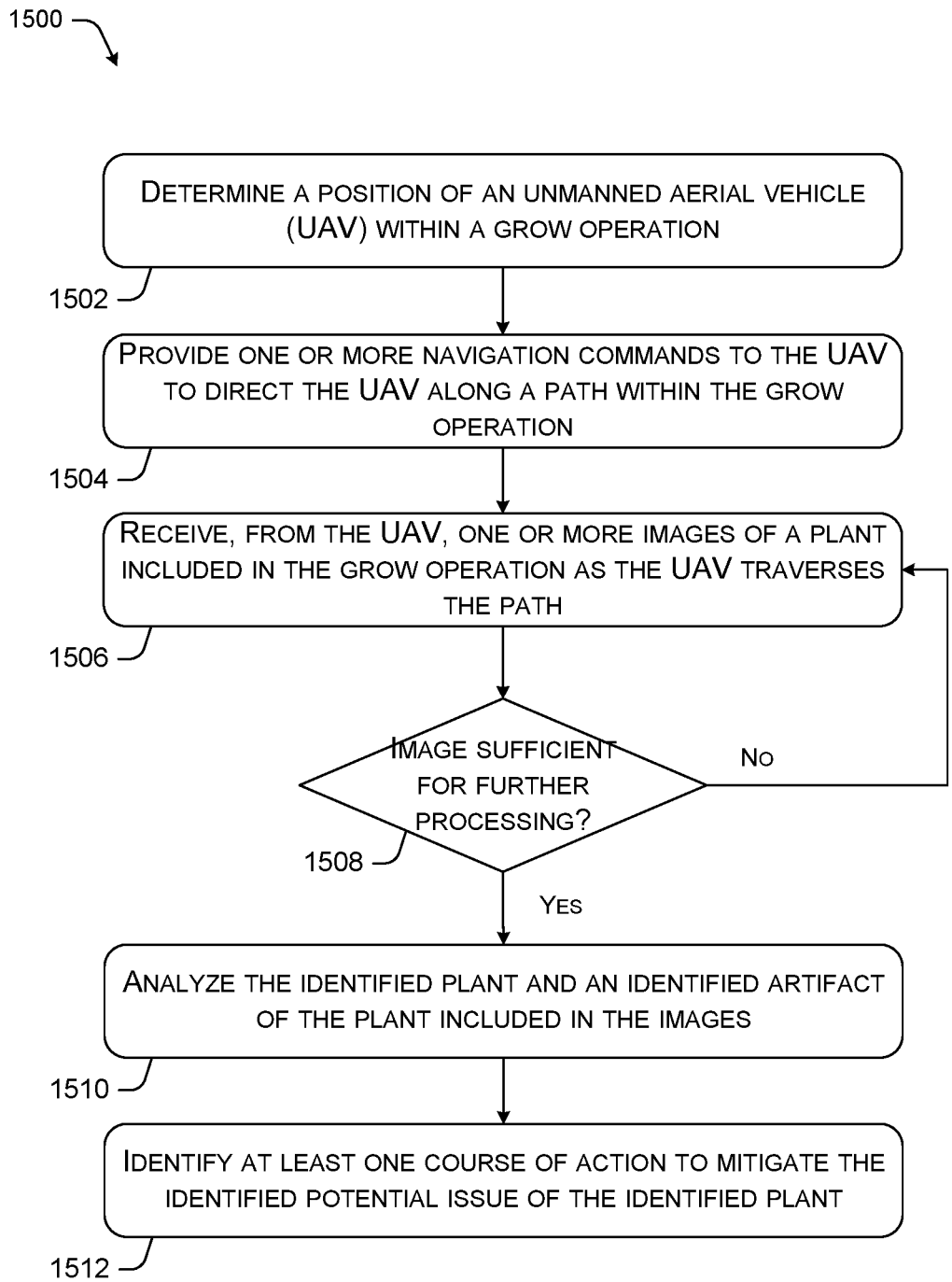
FIG. 15 is an exemplary flow chart of conducting object recognition based horticultural feedback analysis using a UAS.

FIG. 15 is an exemplary flow chart of a process 1500 for conducting object recognition based horticultural feedback analysis using a UAS. At block 1502, the visual observer device determines the position of a UAV within a grow operation. At block 1504, the visual observer device provides one or more navigation commands to the UAV to direct the UAV along a path within the grow operation. At block 1506, the visual observer device receives, from the UAV, one or more images of a plant included in the grow operation as the UAV traverses the path. At decision block 1508, the visual observer device determines whether the image is sufficient for further processing. If the image is not sufficient for further processing ("no" response from the decision block 1508), the visual observer device receives additional images from the UAV. In various embodiments, the UAV may turn around to travel along the path the second time in order to obtain additional images. If the image is sufficient for further processing ("yes" response from the decision block 1508), the visual observer device may analyze the identified plant and an identified artifact of the plant included in the images, as indicated in block 1510. At block 1512, the visual observer device identifies at least one course of action to mitigate the identified potential issue of the identified plant. In various embodiments, the UAV and/or the visual observer device may transmit the images and/or other collected data directly to a central computing device that can provide image analysis service. Additionally, or alternatively, the UAV and/or the visual observer device may transmit the images and/or other collected data to an intermediate server.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   determining a position of an unmanned aerial vehicle (UAV) within a grow operation wherein the position of the UAV is determined based on images of the UAV as captured by at least one visual observer device that is positioned within the grow operation and configured to capture the images of the UAV; and
   providing a first mission comprising one or more operations to the UAV based at least on the position of the UAV and feedback from one or more sensors of the grow operation to direct the UAV to perform the one or more operations in the grow operation, wherein the UAV is configured to capture one or more images of one or more plants included in the grow operation as the UAV performs the one or more operations of the first mission.

2. The computer-implemented method of claim 1, further comprising:
   transmitting the one or more images to an image capture function, the image capture function configured to adjust a configuration setting for an image capture device of the UAV based at least on an image quality of the one or more images.

3. The computer-implemented method of claim 1, further comprising:
   transmitting the one or more images to a central computing device that is configured to provide an image analysis service to process the one or more images; and
   providing a second mission comprising one or more additional operations to the UAV based at least on an outcome of the image analysis service from the central computing device.

4. The computer-implemented method of claim 1, further comprising:
   providing a second mission comprising one or more additional operations to the UAV to direct the UAV to perform the one or more additional operations in a new grow operation.

5. The computer-implemented method of claim 1, further comprising:
   identifying discrete objects within the one or more images, wherein the discrete objects comprise the one or more plants.

6. The computer-implemented method of claim 1, further comprising:
   creating a first plant state vector for a first image of the one or more images;
   creating a second plant vector for a second image of the one or more images; and
   identifying potential issues for the one or more plants based at least on one or more differences between the first plant state vector and the second plant state vector.

7. The computer-implemented method of claim 6, further comprising:
   providing recommendations for a remedial course of action based at least on the potential issues for the one or more plants.

8. The computer-implemented method of claim 1, further comprising:
   identifying one or more artifacts from the one or more images; and
   determining a type of the one or more plants based on the one or more artifacts.

9. The computer-implemented method of claim 1, further comprising determining an issue associated with the one or more plants at the position of the UAV based upon a deviation of the one or more artifacts from an expected feature of the type of the one or more plants.

10. An unmanned aircraft system (UAS) for providing horticultural feedback in a grow operation, the UAS comprising:
    at least one unmanned aerial vehicle (UAV);
    a visual observer device, the visual observer device comprising one or more non-transitory storage mediums configured to provide stored computer-readable instructions, the one or more non-transitory storage mediums coupled to one or more processors, the one or more processors configured to execute the computer-readable instructions to cause the one or more processors to:
    determine a position of a first UAV of the at least one UAV within the grow operation;
    wherein the position of the first UAV is determined based on images of the first UAV as captured by the visual observer device that is positioned within the grow operation and configured to capture the images of the first UAV; and
    provide a first mission comprising one or more operations to the first UAV based at least on the position of the first UAV and feedback from one or more sensors residing at least partially on the visual observer device to direct the first UAV to perform the one or more operations n the grow operation,
    wherein the first UAVs configured to capture one or more images of one or more plants included in the grow operation as the first UAV performs the one or more operations of the first mission.

11. The system of claim 10, wherein the one or more processors are further configured to:
    transmit the one or more images to an image capture function, the image capture function configured to adjust a configuration setting for an image capture device of the first UAV based at least on an image quality of the one or more images.

12. The system of claim 10, wherein the one or more processors are further configured to:
    transmit the one or more images to a central computing device that is configured to provide an image analysis service to process the one or more images; and
    provide a second mission comprising one or more additional operations to the first UAV based at least on an outcome of the image analysis service from the central computing device.

13. The system of claim 10, wherein the one or more processors are further configured to:

determine a position of a second UAV of the at least one UAV within the grow operation; and provide a second mission comprising one or more additional operations to the second UAV based at least on the position of the second UAV and feedback from one or more additional sensors residing at least partially on the visual observer device to direct the second UAV to perform the one or more additional operations in the grow operation.

14. The system of claim 13, wherein the one or more processors are further configured to:

determine a current status of the second UAV;

provide the second mission comprising the one or more additional operations to the first UAV based at least on the current status of the second UAV and additional feedback from one or more additional sensors residing at least partially on the visual observer device to direct the first UAV to perform the one or more additional operations in the grow operation.

15. The system of claim 10, wherein the one or more processors are further configured to:

create a first plant state vector for a first image of the one or more images;

create a second plant vector for a second image of the one or more images; and identify potential issues for the one or more plants based at least on one or more differences between the first plant state vector and the second plant state vector.

16. An unmanned aircraft system (UAS) for providing horticultural feedback in a grow operation, the UAS comprising:

at least one unmanned aerial vehicle (UAV);

a visual observer device, the visual observer device comprising one or more non-transitory storage mediums configured to provide stored computer-readable instructions, the one or more non-transitory storage mediums coupled to one or more processors, the one or more processors configured to execute the computer-readable instructions to cause the one or more processors to:

determine a position of a first UAV of the at least one UAV within the grow operation;

wherein the position of the first UAV is determined based on images of the first UAV as captured by at least one visual observer device that is positioned within the grow operation and configured to capture the images of the first UAV; and provide a first mission comprising one or more operations to the first UAV based at least on the position of the first UAV and feedback from one or more sensors of the first UAV, the first mission directing the first UAV to overfly at least a portion of the grow operation, wherein the first UAV is configured to perform the one or more operations.

17. The system of claim 16, wherein the one or more processors are further configured to:

create a first plant state vector for a first image of the one or more images, the first image associated with a first time stamp;

create a second plant vector for a second image of the one or more images, the second image associated with a second time stamp; and identify potential issues for the one or more plants based at least on one or more differences between the first plant state vector and the second plant state vector.

18. The system of claim 16, wherein the one or more processors are further configured to:

provide recommendations for a remedial course of action based at least on the potential issues for the one or more plants; and transmit the recommendations to a horticultural management device.

19. The system of claim 16, wherein the one or more processors are further configured to:

determine a position of a second UAV of the at least one UAV within the grow operation; and provide a second mission comprising one or more additional operations to the second UAV based at least on the position of the second UAV and feedback from one or more additional sensors residing at least partially on the visual observer device to direct the second UAV to perform the one or more additional operations in the grow operation, wherein the one or more operations of the first mission and the one or more additional operations of the second mission are performed sequentially.

20. The system of claim 19, determine a current status of the second UAV;

provide the second mission comprising the one or more additional operations to the first UAV based at least on the current status of the second UAV and additional feedback from one or more additional sensors residing at least partially on the visual observer device to direct the first UAV to perform the one or more additional operations in the grow operation.

* * * * *